(12) United States Patent
Luo et al.

(10) Patent No.: US 11,616,460 B1
(45) Date of Patent: Mar. 28, 2023

(54) FUZZY FINITE-TIME OPTIMAL SYNCHRONIZATION CONTROL METHOD FOR FRACTIONAL-ORDER PERMANENT MAGNET SYNCHRONOUS GENERATOR

(71) Applicant: GUIZHOU UNIVERSITY, Guiyang (CN)

(72) Inventors: Shaohua Luo, Guiyang (CN); Shaobo Li, Guiyang (CN); Junyang Li, Guiyang (CN); Guanci Yang, Guiyang (CN); Junxing Zhang, Guiyang (CN)

(73) Assignee: GUIZHOU UNIVERSITY, Guiyang (CN)

( * ) Notice: Subject to any disclaimer, the term of this patent is extended or adjusted under 35 U.S.C. 154(b) by 0 days.

(21) Appl. No.: 17/674,369

(22) Filed: Feb. 17, 2022

(30) Foreign Application Priority Data

Oct. 26, 2021 (CN) .......................... 202111246916.1

(51) Int. Cl.
*H02P 21/00* (2016.01)
*H02P 21/14* (2016.01)
*H02J 3/38* (2006.01)
*H02P 101/15* (2016.01)
*H02P 103/20* (2016.01)

(52) U.S. Cl.
CPC .......... *H02P 21/0014* (2013.01); *H02J 3/381* (2013.01); *H02P 21/001* (2013.01); *H02P 21/14* (2013.01); *H02J 2300/28* (2020.01); *H02K 2213/03* (2013.01); *H02P 2101/15* (2015.01); *H02P 2103/20* (2015.01)

(58) Field of Classification Search
CPC ............ H02P 9/00; H02P 9/006; H02P 9/007; H02P 9/008; H02P 9/04; H02P 9/08; H02P 9/10; H02P 9/102; H02P 9/105; H02P 9/107; H02P 9/32; H02P 9/34; H02P 9/305; H02P 9/42; H02P 9/44; H02P 9/48; H02P 23/00; H02P 23/0013; H02P 23/0022; H02P 23/0027; H02P 23/04; H02P 23/12; H02P 23/14; H02P 23/186; H02P 21/00; H02P 21/001; H02P 21/0017; H02P 21/22; H02P 21/14; H02P 21/143; H02P 27/00; H02P 27/04; H02P 27/06; H02P 27/12; H02P 21/30

See application file for complete search history.

(56) References Cited

U.S. PATENT DOCUMENTS 8,860,236 B2 * 10/2014 Nasiri ....................... H02P 9/04
290/55

* cited by examiner

*Primary Examiner* — Antony M Paul
(74) *Attorney, Agent, or Firm* — CBM Patent Consulting, LLC

(57) ABSTRACT

A fuzzy finite-time optimal synchronization control method for a fractional-order permanent magnet synchronous generator, and belongs to the technical field of generators. A synchronization model between fractional-order driving and driven permanent magnet synchronous generators with capacitance-resistance coupling is established. The dynamic analysis fully reveals that the system has rich dynamic behaviors including chaotic oscillation, and a numerical method provides stability and instability boundaries. Then, under the framework of a fractional-order backstepping control theory, a fuzzy finite-time optimal synchronous control scheme which integrates a hierarchical type-2 fuzzy neural network, a finite-time command filter and a finite-time prescribed performance function is provided.

3 Claims, 14 Drawing Sheets

FUZZY FINITE-TIME OPTIMAL SYNCHRONIZATION CONTROL METHOD FOR FRACTIONAL-ORDER PERMANENT MAGNET SYNCHRONOUS GENERATOR

CROSS REFERENCES

This application claims priority to Chinese Patent Application Ser. No. CN202111246916.1 filed on 26 Oct. 20.

TECHNICAL FIELD

The present invention belongs to the technical field of generators, and relates to a fuzzy finite-time optimal synchronization control method for a fractional-order permanent magnet synchronous generator.

BACKGROUND

A permanent magnet synchronous generator is one of the most important electric power equipment, and can convert wind energy into mechanical work, and the mechanical work drives magnetic rotors to rotate so as to output alternating current. At present, it is widely used for high-speed power generation, renewable energy power generation, wind power generation, and the like. Permanent magnet synchronous generators in wind power plants are typically operated in harsh environments, and fluctuations from local wind speeds, generator temperatures, magnetic fields, friction and workload are unavoidable. These fluctuations may cause many nonlinear dynamics phenomena such as chaotic oscillation, multi-stability and bifurcation of the permanent magnet synchronous generator. These fluctuations can lead to a degradation of the performance of the permanent magnet synchronous generator and even to a damage to the generator without taking effective measures. In addition, with the improvement of living standard, there are higher and higher requirements on the reliability and safety of the permanent magnet synchronous generator system. Therefore, how to accurately model, reveal stable and unstable boundaries of system motion, and provide a fuzzy finite-time optimal synchronous control scheme between fractional-order driving and driven permanent magnet synchronous generators within a prescribed performance range has important significance and challenge.

Compared with integral-order calculus, fractional-order calculus can establish a more accurate model, describe dynamic characteristics of an actual engineering system more truly, and simultaneously obtain the optimal dynamic response by adjusting fractional-order values of the system. Westerlund and Ekstam experimentally demonstrated fractional-order values of various capacitor media, and found a close fractional-order relationship between current and voltage. Luo et al. experimentally verified the control performance of a fractional-order system using a fractional-order capacitive membrane model. For modeling and dynamic analysis of fractional-order generators, there have been sporadic literature reports over the past few decades. Xu et al. established a fractional-order model of a hydro-generator set system and performed nonlinear dynamic analysis on the model using six typical fractional-order values. Borah and Roy performed dynamic analysis of a fractional-order permanent magnet synchronous generator and proposed a single-state predictive control method. Ardjal et al. established a fractional-order model of a wind energy conversion system and designed a nonlinear cooperative controller of a generator and a grid converter. These important findings have certain inspirations for the current research. However, these models are limited to analyzing a single generator, and do not consider the coupling strength between generators; and the corresponding dynamic analysis does not give stable and unstable boundaries and regions, and does not consider the system control problem such as finite-time, uncertainty, performance constraints and optimization.

The synchronization of coupled systems has attracted much attention in nonlinear science, for example, synchronization control can make multiple generators achieve accurate frequency coincidence in parallel mode in the field of power generation. In order to better address this problem, an enormous amount of valuable work such as robust synchronization, adaptive synchronization and optimal synchronization control are emerging continuously. However, these works are limited to integral-order systems that do not consider the strengths of the bidirectional and unidirectional coupling, and these systems do not generate complex nonlinear dynamics when conditions fluctuate, deviating from the discussed subject of synchronous control. Sadeghi et al. solved the problem of smooth synchronization of brushless doubly-fed induction generators by using machine models. Zhu et al. solved the synchronization problem of chaotic oscillation permanent magnet synchronous generator networks by using a self-adaptive pulse control method. The above literatures do not disclose chaos and periodic intervals in an integer-order generator. At the same time, failure of these schemes without pre-configured performance is inevitable due to perturbation and uncertainty of system modeling parameters.

As an effective control method, backstepping control is widely applied to integer-order uncertain nonlinear systems by fusing a fuzzy logic system or a neural network. Some researchers extend the backstepping control to the field of a fractional-order. In view of the inherent "complexity explosion" problem of backstepping control, whether the backstepping control belongs to an integer-order or a fractional-order, a first-order low-pass filter, a tracking differentiator and an observer are generally adopted to solve the problem. However, the coupled permanent magnet synchronous generator is completely different from a nonlinear mathematical model, the mathematical model can not generate undesirable dynamic behaviors such as chaotic oscillation and multi-stability, and meanwhile, the fuzzy finite-time optimal synchronous control is not mentioned in the above work. Optimal control is an important research topic because it consumes less resources. Some scholars introduce the optical control into the backstepping control of the nonlinear system, thus fully exerting their advantages. The finite-time control of the nonlinear system has the advantages of high response speed, high convergence precision and the like, and is a research topic worthy of attention. In a wind power farm, a unidirectional coupling fractional-order permanent magnet synchronous generator system is a highly complex system with surrounding generators coupled. For a method to fuse effective methods such as optimal control, backstepping control and finite-time control and the like, a fuzzy finite-time optimal synchronous control scheme of a unidirectional coupled permanent magnet synchronous generator system is provided to achieve specified performance, which is still a prominent problem in the field of fractional-order control.

SUMMARY

In view of the above, the present invention is intended to provide a fuzzy finite-time optimal synchronization control method for a fractional-order permanent magnet synchronous generator.

For the above purposes, the present invention provides the following technical scheme.

Provided is a fuzzy finite-time optimal synchronization control method for the fractional-order permanent magnet synchronous generator, which comprises the following steps:

S1: modeling a system;

S2: designing a numerical method and applying the numerical method to solve a nonlinear fractional-order system; and S3: establishing a hierarchical type-2 fuzzy neural network and designing a controller that provides an ordered and coordinated motion for the fractional-order permanent magnet synchronous generator.

Optionally, the S1 specifically comprises that: a wind energy conversion system consists of a wind turbine, a permanent magnet synchronous generator and three converters, and the three converters are sequentially a diode bridge rectifier, a DC/DC boost converter and an inverter in the order; the electric energy generated by the permanent magnet synchronous generator is transmitted to a grid through the converters;

in combination with local aerodynamic characteristics, the power generated by the wind turbine is expressed as:

$$P_w = \frac{1}{2}\rho\pi C_p(\omega_r R/v_w, \beta)R^2 v_w^3 \qquad (1)$$

wherein $\rho$, R, $\omega_r$, $\beta$, $\omega_r$ and $v_w$ represent air density, turbine radius, rotation speed, propeller blade angle, rotation speed and wind speed, respectively, and $C_p(\omega_r R/v_w,\beta)$ represents turbine power coefficient;

a mechanical fractional-order model of the permanent magnet synchronous generator is provided according to rotation law:

$$J\frac{d^\alpha \omega_r}{dt^\alpha} = T_g - b\omega_r - T_t \qquad (2)$$

wherein $\alpha$, J, $T_t$, $T_g$, $\tilde{t}$ and b represent fractional-order coefficient, system inertia, turbine torque, generator torque, time and viscous friction coefficient, respectively;

the torque of an electromagnetic generator is expressed as:

$$T_g = \frac{3}{2}p((L_q - L_d)i_d i_q + i_q \phi) \qquad (3)$$

wherein $L_d$ and $L_q$ represent d-axis inductance and q-axis inductance, respectively, $i_d$ and $i_q$ represent d-axis stator current and q-axis stator current, respectively, and p and $\phi$ represent the number of pole pairs and magnetic flux of permanent magnets in a three-phase permanent magnet synchronous generator, respectively;

the fractional-order model of the permanent magnet synchronous generator in a synchronous rotating d-q reference frame is expressed as:

$$\begin{cases} \frac{d^\alpha i_d}{dt^\alpha} = (-R_s i_d + \omega_r L_q i_q + V_d)/L_d, \\ \frac{d^\alpha i_q}{dt^\alpha} = (-R_s i_q - (L_d i_d + \phi)\omega_r + V_q)/L_q, \end{cases} \qquad (4)$$

wherein $R_s$, $V_d$ and $V_q$ represent stator resistance, d-axis stator voltage and q-axis stator current, respectively;

in the Laplace domain, a fractional-order integrator in the form of linear approximation with a zero pole pair is represented by a transfer function with a slope of −20m dB/decade in a Bode diagram:

$$F(s) = \frac{1}{s^\alpha} \approx \prod_{i=0}^{N_f-1}(1+s/Q_i) \Big/ \prod_{i=0}^{N_f-1}(1+s/P_i) \qquad (5)$$

wherein $$N_f = \text{integer}\left(\frac{\log(\omega_{max}/p_f)}{\log\left(10^{d_f/10(1-\alpha)}\cdot 10^{d_f/10\alpha}\right)}\right)+1,$$

and $P_f$, $\omega_{max}$ and $d_f$ represent difference values between angular frequency, bandwidth and actual line and approximate line, respectively; $Q_i$ and $P_i$ represent zero and pole of singularity function, respectively;

$L=L_d=L_q$ is obtained due to symmetrical stator windings; a fractional-order model of the permanent magnet synchronous generator is defined by equation (2) and equation (4) as follows:

$$\begin{cases} {}^C D_{0,t}^\alpha \omega_r = (3p\phi i_q/2 - b\omega_r - T_t)/J, \\ {}^C D_{0,t}^\alpha i_q = (-R_s i_q - (Li_d + \phi)\omega_r + V_q)/L, \\ {}^C D_{0,t}^\alpha i_d = (-R_s i_d + \omega_r L i_q + V_d)/L, \end{cases} \qquad (6)$$

wherein ${}^C D_{0,t}^\alpha$ represents Caputo fractional-order derivative with $\alpha>0$ and starting point at origin;

by introducing new variables $x_1 = L\omega_r/R_s$, $x_2 = pL\phi i_q/bR_s$ and $x_3 = pL\phi i_d/bR_s$, a normalized fractional-order model of a permanent magnet synchronous main motor is expressed as:

$$\begin{cases} {}^C D_{0,t}^\alpha x_1 = \sigma x_2 - \rho x_1 + T_L, \\ {}^C D_{0,t}^\alpha x_2 = -x_2 - x_1 x_3 + \mu x_1 + u_q, \\ {}^C D_{0,t}^\alpha x_3 = -x_3 + x_1 x_2 + u_d, \end{cases} \qquad (7)$$

wherein $t = \tilde{t}R_s/L$, $u_q = pL\phi V_q/bR_s^2$, $u_d = pL\phi V_d/bR_s^2$, $T_L = -L^2 T_t/JR_s^2$, $\mu = -p\phi^2/bR_s$, $\sigma = 3Lb/2JR_s$ and $\rho = bL/JR_s$, and $x_1$, $x_2$, $x_3$, $t$, $u_q$, $u_d$ and $T_L$ represent normalized angular velocity, q-axis current, d-axis current, time, q-axis voltage, d-axis voltage and load torque, respectively; $\sigma$, $\rho$ and $\mu$ represent system parameters;

a fractional-order model of the driven permanent magnet synchronous generator is established by using a Heaviside function $H(t-T_g)$:

$$\begin{cases} {}^C D_{0,t}^\alpha y_1 = \sigma y_2 - \rho y_1 + T_L, \\ {}^C D_{0,t}^\alpha y_2 = -y_2 - y_1 y_3 + \mu y_1 + (\kappa_1(y_1-x_1) + \kappa_2(y_2-x_2))\cdot \\ \qquad H(t-t_g) + u_q + u_2, \\ {}^C D_{0,t}^\alpha y_3 = -y_3 + y_1 y_2 + u_d + u_3, \end{cases} \qquad (8)$$

wherein $t_g$, $\kappa_1$, and $\kappa_2$ represent primary synchronous time, the capacitance coupling and the resistance coupling, respectively, and $u_2$ and $u_3$ represent control inputs;

synchronization errors are defined as $e_1=y_1-x_1$, $e_2=y_2-x_2$ and $e_3=y_3-x_3$; the following equation is obtained by subtracting equation (7) from equation (8):

$$\begin{cases} {}^C D_{0,t}^\alpha e_1 = \sigma e_2 - \rho e_1, \\ {}^C D_{0,t}^\alpha e_2 = -e_2 - y_1 y_3 + x_1 x_3 + \mu e_1 - (\kappa_1 e_1 + \kappa_2 e_2) H(t - t_g) + u_2, \\ {}^C D_{0,t}^\alpha e_3 = -e_3 + y_1 y_2 - x_1 x_2 + u_3. \end{cases} \quad (9)$$

Definition 1: for a sufficiently differentiable function $F(t)$, the Caputo fractional-order derivative is expressed as:

$${}^C D_{0,t}^\alpha F(t) = \frac{1}{\Gamma(n-\alpha)} \int_0^t \frac{F^{(n)}(\tau)}{(t-\tau)^{1-n+\alpha}} d(\tau) \quad (10)$$

wherein $$\Gamma(n-\alpha) = \int_0^\infty e^{-t} t^{n-\alpha-1} dt$$

represents Euler gamma function, $n-1 < \alpha < n$, and $n \in \mathbb{N}_+$; a Laplace transform is performed on equation (10) to obtain:

$$L\{{}^C D_{0,t}^\alpha F(t)\} = s^\alpha L\{F(t)\} - \sum_{k=0}^{n-1} \frac{F^{(k)}(0)}{s^{k+1-\alpha}} \quad (11)$$

for any continuous function, when $0 < \alpha < 1$ and $F_1(t)$ and $F_2(t)$ are within an interval $[0, t_\varsigma]$, the following equation is obtained:

$$F_1(t) \cdot {}^C D_{0,t}^\alpha F_2(t) + F_2(t) \cdot {}^C D_{0,t}^\alpha F_1(t) = {}^C D_{0,t}^\alpha (F_1(t) \cdot F_2(t)) + \frac{\alpha}{\Gamma(1-\alpha)} \int_0^t \frac{1}{(t-\varsigma)^{1-\alpha}} \left( \int_0^\varsigma \frac{F_1'(\varsigma_1) d\varsigma_1}{(t-\varsigma_1)^\alpha} \cdot \int_0^\varsigma \frac{F_2'(\varsigma_2) d\varsigma_2}{(t-\varsigma_2)^\alpha} \right) d\varsigma \quad (12)$$

when $F_1(t)=F_2(t)$, the following inequation is derived as:

$${}^C D_{0,t}^\alpha (F^2(t)) \leq 2F(t) \cdot {}^C D_{0,t}^\alpha F(t) \quad (13)$$

Lamma 1: for any $x_s, y_s \in \mathbb{R}$, $\vartheta(x_s, y_s)$ is any positive real function and then the following inequation holds if $c_s > 0$ and $d_s > 0$.

$$|x_s|^{c_s} |y_s|^{d_s} \leq \frac{c_s \vartheta(x_s, y_s) |x_s|^{c_s+d_s}}{c_s + d_s} + \frac{d_s \vartheta(x_s, y_s)^{-\frac{c_s}{d_s}} |y_s|^{c_s+d_s}}{c_s + d_s} \quad (14)$$

Definition 2: a minimum performance cost function is as follows:

$$\bar{J} = \int_0^\infty \left( \bar{Q}(\bar{S}(t)) + U^T \bar{R} U \right) dt \quad (15)$$

wherein $\bar{S}$, $U$ and $\bar{R}$ represent a penalty function, an optimal control input and an N-order matrix, respectively, and $\bar{Q}(\bar{S}) > 0$.

Optionally, the S2 specifically comprises that:
for a fractional-order differential equation ${}^C D_{0,t}^\alpha y_f(t) = g(t, y_f(t))$, $t \geq 0$ with a given function $g(\bullet, \bullet)$, the fractional-order derivative quotient of $y_f(t)$ is defined as an infinite series, i.e., $${}^C D_{0,t}^\alpha y_f(t) = \lim_{h \to 0} \frac{1}{h^\alpha} \sum_{j=0}^{\lfloor t/h \rfloor} \omega_j^{(\alpha)} (y_f(t-jh) - y_f(0)), \omega_j^{(\alpha)} = (-1)^j \binom{\alpha}{j} \quad (16)$$

wherein $h > 0$ and $\omega_j^{(\alpha)}$ represent step size and coefficient, respectively, and a condition based on the Euler-Gamma function is satisfied as follows:

$$\binom{\alpha}{j} = \begin{cases} \Gamma(\alpha+1)/\Gamma(\alpha+1-j)j! & J=0, \ldots, \alpha, \\ 0 & j > \alpha. \end{cases} \quad (17)$$

an equidistant grid $t_n = nh$, $n=0, 1, \cdots, N$ is defined in an interval $[0\ T]$, wherein $N=T/h$; an integral expression is then obtained when $t=t_n$:

$$y_f(t_n) = y_{f0} + \frac{1}{\Gamma(\alpha)} \sum_{j=0}^{n-1} \int_{t_j}^{t_{j+1}} (t_n - \tau)^{\alpha-1} g(\tau, y_f(\tau)) d\tau \quad (18)$$

a vector field $g(\tau, y_f(\tau))$ is approximated by a constant $g(t_j, y_{f_j})$ over each subinterval $[t_j, t_{j+1}]$; a numerical value of equation (18) is rewritten as:

$$y_f(t_n) = y_{f0} + h^\alpha \sum_{j=0}^{n-1} \frac{((n-j)^\alpha - (n-j-1)^\alpha)}{\Gamma(\alpha+1)} g(t_j, y_{f_j}) \quad (19)$$

system parameters of the fractional-order model of the driving/driven permanent magnet synchronous generator are set to be three working conditions:

working condition 1: $\alpha=0.99$, $\sigma=3$, $\rho=4$, $\mu=25$, $T_L=0$, and the initial conditions are $x_1(0)=0.1$, $x_2(0)=0.9$, and $x_3(0)=20$;

working condition 2: $\alpha=0.99$, $\sigma=17$, $\rho=16$, $\mu=25$, $T_L=0$, and the initial conditions are $x_1(0)=1.5$, $x_2(0)=0.5$, and $x_3(0)=20$; and working condition 3: $\alpha=0.99$, $\sigma=5.5$, $\rho=5.5$, $\mu=20$, $T_L=0$, and the initial conditions are $x_1(0)=0.1$, $x_2(0)=0.1$, and $x_3(0)=3$;

approximate transfer functions of different fractional-orders are given by introducing equation (5):

$$\frac{1}{s^{0.998}} = \frac{9.95405(1 + 9.65984 \times 10^{-10} s)(1 + 9.8853 \times 10^{-5} s)}{(1 + 9.43952 \times 10^{-10} s)(1 + 9.65984 \times 10^{-5} s)(1 + 9.8853 s)} \quad (20)$$

$$\frac{1}{s^{0.992}} = \frac{9.81748(1 + 9.32735 \times 10^{-5} s)(1 + 0.0308972 s)}{(1 + 8.90424 \times 10^{-5} s)(1 + 0.0294957 s)(1 + 9.77056 s)} \quad (21)$$

$$\frac{1}{s^{0.98}} = \frac{(9.54993(1 + 7.90604 \times 10^{-6} s)}{(1 + 7.19686 \times 10^{-6} s)} \cdot \frac{(1 + 0.000868511 s)(1 + 0.0954095 s)}{(1 + 0.000790604 s)(1 + 0.0868511 s)(1 + 9.54 s)} \quad (22)$$

error values in the above equations are $\leq 0.1$ dB, $\leq 0.2$ dB and $\leq 0.4$ dB, respectively.

Optionally, the S3 specifically comprises that:
the hierarchical type-2 fuzzy neural network consists of an input layer, a membership layer, a rule layer, a type-reduction layer and an output layer;
at the second level, upper and lower membership levels are written as:

$$\bar{\mu}_{\tilde{A}_i^j}(x_i) = \exp(-((x_i - m_{\tilde{A}_i^j})/\bar{\sigma}_{\tilde{A}_i^j})^2/2),$$
$$\underline{\mu}_{\tilde{A}_i^j}(x_i) = \exp(-((x_i - m_{\tilde{A}_i^j})/\underline{\sigma}_{\tilde{A}_i^j})^2/2), \; i=1, \cdots, N \quad (23)$$

wherein $m_{\tilde{A}_i^j}$, $\bar{\sigma}_{\tilde{A}_i^j}$ and $\underline{\sigma}_{\tilde{A}_i^j}$ represent a center, an upper width and a lower width of the $j^{th}$ membership level of the $i^{th}$ input, respectively;
in the rule layer, an upper/down trigger rule is calculated as:

$$\bar{T}_{ac}^j = \bar{\mu}_{A_1}{}^a(x_1)\bar{\mu}_{A_2}{}^c(x_2), \; \underline{T}_{ac}^j = \underline{\mu}_{A_1}{}^a(x_1)\underline{\mu}_{A_2}{}^c(x_2) \quad (24)$$

in the fourth layer, $Y_R$ and $Y_L$ are expressed in the form of a set type-reduction center as:

$$Y_R = \frac{\sum_{j=1}^{M} R^j \underline{T}^j w_R^j + \sum_{j=r+1}^{M} (1-R^j)\bar{T}^j w_R^j}{\sum_{j=1}^{M} R^j \underline{T}^j w_R^j + \sum_{j=r+1}^{M} (1-R^j)\bar{T}^j} \quad (25)$$

$$Y_L = \frac{\sum_{j=1}^{M} L^j \bar{T}^j w_L^j + \sum_{j=l+1}^{M} (1-L^j)\underline{T}^j w_L^j}{\sum_{j=1}^{M} L^j \bar{T}^j + \sum_{j=l+1}^{M} (1-L^j)\underline{T}^j}$$

wherein $w_R^j$ and $w_L^j$ are referred as weight, $\underline{T}^j$ and $\bar{T}^j$ represent upper and lower trigger degrees of the $j^{th}$ rule, M represents the number of fuzzy rules, $$R \equiv \begin{bmatrix} 1 & \cdots & 1 & 0 & \cdots & 0 \\ 1 & \cdots & r & r+1 & \cdots & M \end{bmatrix} \in \mathbb{R}^M, \text{ and } L \equiv \begin{bmatrix} 1 & \cdots & 1 & 0 & \cdots & 0 \\ 1 & \cdots & l & l+1 & \cdots & M \end{bmatrix} \in \mathbb{R}^M;$$

in the output layer, the fuzzy output in the form of vector is derived as:

$$Y = w^T \xi = w_R^T \xi_R + w_L^T \xi_L \quad (26)$$

wherein $$w \equiv [w_R \; w_L], \; w_R \equiv \frac{1}{2}[w_R^1 \; \cdots \; w_R^M]^T, \; w_L \equiv \frac{1}{2}[w_L^1 \; \cdots \; w_L^M]^T,$$

$$\xi_R \equiv \left[ \frac{R^1 \underline{T}^1 + (1-R^1)\bar{T}^1}{\sum_{j=1}^{M} R^j \underline{T}^j + \sum_{j=r+1}^{M} (1-R^j)\bar{T}^j} \; \cdots \; \frac{R^M \underline{T}^M + (1-R^M)\bar{T}^M}{\sum_{j=1}^{M} R^j \underline{T}^j + \sum_{j=r+1}^{M} (1-R^j)\bar{T}^j} \right]^T,$$

$$\xi_L \equiv \left[ \frac{L^1 \underline{T}^1 + (1-L^1)\bar{T}^1}{\sum_{j=1}^{M} L^j \underline{T}^j + \sum_{j=r+1}^{M} (1-L^j)\bar{T}^j} \; \cdots \; \frac{L^M \underline{T}^M + (1-L^M)\bar{T}^M}{\sum_{j=1}^{M} L^j \underline{T}^j + \sum_{j=r+1}^{M} (1-L^j)\underline{T}^j} \right]^T,$$

$$\xi \equiv [\xi_R \; \xi_L].$$

by calling equation (26), the hierarchical type-2 fuzzy neural network realizes high-precision approximation to any unknown but bounded function on a compact set, then $$\sup_{X \in D_X} |h(X) - w^T \xi(X)| \leq \cup \varepsilon(X) \quad (27)$$

wherein $X \equiv [x_1 \cdots x_i]^T \in \mathbb{R}$, $i = 1 \cdots N$, N represents the number of inputs, $\varepsilon(X) > 0$ represents approximation errors, and $\Omega_w$ and $D_X$ are compact sets of appropriate bounds of w and X, respectively; an optimal parameter w* is introduced, and the parameter meets the condition:

$$\arg \min_{w \in \Omega_w} \left[ \sup_{X \in D_X} |h(X) - \hat{h}(X, w)| \right],$$

$\hat{h}$ represents approximation values of h; $\tilde{w} = w - W^*$ is defined, wherein w* represents an amount of labor for analysis;
in order to avoid exponential increase of the number of rules, two criteria of tracking error reduction rate and fuzzy rule $\varepsilon$ completeness are adopted to execute the structural adjustment of the hierarchical type-2 fuzzy neural network. The tracking error reduction rate is equivalent to the derivative of the square of tracking errors between a drive system output and a response system. The completeness of the fuzzy rule is defined as that "at least one fuzzy rule ensures that the trigger strength within an operation range is not less than $\varepsilon$". If the membership grade is equal to or greater than 0.5 in the hierarchy structure, the membership grade is saved. Otherwise, these unimportant rules in a self-structure algorithm is deleted.

In order to improve solving speed and simplify the structure, the hierarchical type-2 fuzzy neural network is transformed as follows:

$$w^T \xi(X) \leq \zeta \xi^T(X) \xi(X)/2b^2 + b^2/2 \quad (28)$$

wherein $\zeta = \|w\|^2$, and $b > 0$; $\tilde{\zeta} = \zeta - \hat{\zeta}$, wherein $\hat{\zeta}$ represents estimate values of $\zeta$, and ${}^C D_{0,t}^\alpha \tilde{\zeta} = -{}^C D_{0,t}^\alpha \hat{\zeta}$;
in order to avoid system performance degradation and suppress the convergence characteristics of error variables, a positive and strictly monotonically decreasing finite-time prescribed performance function is designed:

$$\beta(t) = \begin{cases} a_3 t^3 + a_2 t^2 + a_1 t + a_0, & t \in [0, T_0) \\ \beta_{T_0}, & t \geq T_0 \end{cases} \quad (29)$$

wherein $a_i$, $i = 0, \cdots, 3$ represents design parameters, and $T_0$ and $\beta_{T_0}$ represent convergence time and convergence boundary, respectively; the performance function satisfies the following constraints:

$$\begin{cases} \beta(0) = \beta_0, & {}^C D^\alpha \beta(0) = 0, \\ \beta(t | t \geq T_0) = \beta_{T_0}, & {}^C D^\alpha \beta(t | t \geq T_0) = 0, \end{cases} \quad (30)$$

wherein $\beta_0$ represents the initial value of the finite-time prescribed performance function;
when a constraint signal is matched with the convergence rate of the prescribed performance function, a constraint condition suppresses a large overshoot of the control output at an initial stage; for the pre-given parameters $\beta_0$, $T_0$ and $\beta_{T_0}$, a satisfactory finite-time prescribed performance function is easily obtained by appropriate selection of four design parameters;
in order to achieve a faster response, a fractional-order finite-time command filter based on a first order Levant differentiator is provided:

$$\begin{cases} {}^C D_{0,t}^\alpha Z_{i,1} = \overline{Z}_{i,1}, \\ \overline{Z}_{i,1} = -c_{i,1} |Z_{i,1} - \alpha_r|^{\frac{1}{2}} \text{sign}(Z_{i,1} - \alpha_r) + Z_{i,2} \\ {}^C D_{0,t}^\alpha Z_{i,2} = -c_{i,2} \text{sign}(Z_{i,2} - \overline{Z}_{i,1}), i = 1, \ldots, N \end{cases} \quad (31)$$

wherein $Z_{i,1} \in \mathbb{R}$ and $Z_{i,2} \in \mathbb{R}$ represent states of the command filter, $\alpha_r \in \mathbb{R}$ represents input signals of the command filter, $c_{i,1}$ and $c_{i,2}$ represent positive design constants, and positive constants $\Gamma_{i,1}$ and $\Gamma_{i,2}$ satisfy conditions $|Z_{i,1} - \alpha_r| \leq \Gamma_{i,1}$ and $|\overline{Z}_{i,1} - {}^C D_{0,t}^\alpha \alpha_2| \Gamma_{i,2}$;
obviously, by appropriate selection of $c_{i,1}$ and $c_{i,2}$, $Z_{i,1} = \alpha_r$ and $\overline{Z}_{i,1} = {}^C D_{0,t}^\alpha \alpha_r$ when input noises are completely suppressed during transients of limited time;
error variables are introduced:

$$z_2 = e_2 - \alpha_2^c, z_3 = e_3 - \alpha_3^c \quad (32)$$

wherein $\alpha_i^c$, i=2, 3 and $Z_{i,1}$, i=2, 3 are the same, representing the output of the fractional-order command filter;
the compensated tracking error is represented as:

$$\upsilon_i = z_i - \theta_i, i = 1, 2, 3 \quad (33)$$

wherein $\theta_i$ represents a compensation signal between virtual control and filtered signals;
the error variables have the following inequation:

$$-\underline{\rho}\beta(t) < e_1 < \overline{\rho}\beta(t), \forall t \geq 0 \quad (34)$$

wherein $0 < \underline{\rho}, \overline{\rho} \leq 1$;
a smooth and invertible function $S_1(z_1)$ is defined, and the above inequation is rewritable to an unconstrained form:

$$e_1 = \beta(t) S_1(z_1) \quad (35)$$

it is noted that $(\overline{\rho} e^z - \underline{\rho} e^{-z})/(e^z + e^{-z})$ belongs to one of the above-described smooth and invertible functions;
then the inverse transform of equation (35) is written as:

$$z_1 = S_1^{-1}(\phi(t)) \quad (36)$$

wherein $\phi_1(t) = e_1(t)/\beta(t)$;
the fractional-order derivative of equation (36) is derived as:

$${}^C D_{0,t}^\alpha z_1 = \beta^{-1}(t) \cdot {}^C D_{\phi(t)}^\alpha S_1^{-1}(\bullet)({}^C D_{0,t}^\alpha e_1(t) - \phi_1(t) {}^C D\_hd\ 0,t^\alpha \beta(t)) = \eta_1({}^C D_{0,t}^\alpha e_1 - r_1), \quad (37)$$

wherein $\eta_1 = \beta^{-1}(t) \cdot {}^C D_{\phi(t)}^\alpha S_1^{-1}(\phi(t))$, and $r_1 = \phi_1(t) {}^C D_{0,t}^\alpha \beta(t)$.

By using equations (9) and (37), then:

$${}^C D_{0,t}^\alpha z_1 = \eta_1(f_1 + \sigma e_2 - r_1), {}^C D_{0,t}^\alpha e_2 = f_2 + u_2, {}^C D_{0,t}^\alpha e_3 = f_3 + u_3 \quad (38)$$

$f_1 = -\rho e_1, f_2 = -e_2 - y_1 y_3 + x_1 x_3 - (\kappa_1 e_1 + \kappa_2 e_2) H(t - t_g) + \mu e_1$ and $f_3 = -e_3 - y_1 y_2 - x_1 x_2$ are all regarded as unknown nonlinear functions due to perturbations from wind speeds, generator temperatures, stator resistance, friction coefficient, workload, and the like;
the design of the controller comprises three steps based on a fractional-order backstepping control principle;
step 1: the above-described hierarchical type-2 fuzzy neural network is adopted to perform estimation on a compact set for facilitating controller design considering the uncertainty of $f_1$, i.e., $$f_1 = w_1^T \xi_1(\bullet) + \varepsilon_1(\bullet) \quad (39)$$

wherein (•) represents abbreviations of $(x_1, x_2, x_3)$,
a first Lyapunov-candidate-function is selected as:

$$V_1 = \frac{1}{2}\upsilon_1^2 + \frac{1}{2}\zeta_1^2 + \frac{1}{2}\theta_1^2 \quad (40)$$

the fractional-order derivative of $V_1$ is taken to obtain:

$${}^C D_{0,t}^\alpha V_1 \leq \upsilon_1 \eta_1 [f_1 + \overline{\sigma}(z_2 + \alpha_2^c + \alpha_2^v - \alpha_2^v) - r_1] - \upsilon_1 {}^C D_{0,t}^\alpha \theta_1 - \zeta_1 {}^C D_{0,t}^\alpha \zeta_1 + \theta_1 {}^C D_{0,t}^\alpha \theta_1 \leq \upsilon_1 \eta_1 [\upsilon_1 \eta_1 \zeta_1 \xi_1^T(\bullet) \xi_1(\bullet)/2b_1^2 + \varepsilon_1 + \overline{\sigma} z_2 + \overline{\sigma}\alpha_2^v + \overline{\sigma}(\alpha_2^c - \alpha_2^v) - r_1] - \upsilon_1 {}^C D_{0,t}^\alpha \theta_1 + \theta_1 {}^C D_{0,t}^\alpha \theta_1 + b_1^2/2 + \zeta_1 (\upsilon_1^2 \eta_1^2 \xi_1^T(\bullet) \xi_1(\bullet)/2b_1^2 - {}^C D_{0,t}^\alpha \zeta_1) \quad (41)$$

wherein $\alpha_2^v$ and $\overline{\sigma}$ represent virtual control and $\sigma$ upper bound, respectively, and $\zeta_1 = \|w_1\|^2$ and $b_1 > 0$;
the following cost function is designed to achieve its minimum value by definition 2;

$$J_i = \int_0^\infty (\upsilon_i^2 + \delta_1^2 \upsilon_i^2 + \kappa_i^2 u_{oi}^2) dt, i = 2, 3 \quad (42)$$

wherein $u_{oi}$, $\delta_i^2$, and $\kappa_i$ represent an optimal control input, a normal constant and a design parameter, respectively; the following inequation $\xi_i^2(\bullet) \leq \delta_i^2 \upsilon_i^2$, i=1, 2, 3 is used in order to compensate estimation errors of the hierarchical type-2 fuzzy neural network;
the optimal control input is designed as $u_{oi} = -P_i \upsilon_i/\kappa_i^2$, i=1, 2, 3, wherein $P_i$ is the solution of an algebraic Riccati equation $P_i^2 + 2k_i P_i - \kappa_i^2 - 1 = 0$, $k_i > 0$;
the optimal control input is derived as:

$$u_{oi} = -(\sqrt{1 + k_i^2 + \delta_i^2} - k_i) \upsilon_i/\kappa_i^2, i = 1, 2, 3 \quad (43)$$

virtual control, and an adaptive law and a compensation signal thereof are selected:

$$\alpha_2^v = (-k_1 z_1 - \upsilon_1 \eta_1 \zeta_1 \xi_1^T(\bullet) \xi_1(\bullet)/2b_1^2 + r_1 - s_1 \upsilon_1^\gamma + u_{oi})/\overline{\sigma} \quad (44)$$

$${}^C D_{0,t}^\alpha \zeta_1 = \upsilon_1^2 \eta_1^2 \xi_1^T(\bullet) \xi_1(\bullet)/2b_1^2 - \gamma_1 \zeta_1 \quad (45)$$

$${}^C D_{0,t}^\alpha \theta_1 = -k_1 \eta_1 \theta_1 + \overline{\sigma} \eta_1 (\alpha_2^c - \alpha_2^v + \theta_2) - l_1 \theta_1^\gamma \quad (46)$$

wherein $k_1 > 0$, $l_1 > 0$, $\gamma_1 > 0$, $s_1 > 0$, and $0 < \gamma < 1$;
equations (44)-(46) are substituted into inequation (41) by inequation (14) to obtain:

$${}^C D_{0,t}^\alpha V_1 \leq -k_1 \eta_1 \upsilon_1^2 - k_1 \eta_1 \theta_1^2 + \overline{\sigma} \eta_1 \upsilon_1 \upsilon_2 + \overline{\sigma} \eta_1 \theta_1 \theta_2 + \overline{\sigma} \eta_1 (\theta_1^2 + \Gamma_{2,1}^2)/2 + b_1^2/2 + \gamma_1 \zeta_1 \zeta_1 + \eta_1 \upsilon_1^2 (\frac{1}{2} + \delta_1^2/2 - (\sqrt{1 + k_1^2 + \delta_1^2}/\kappa_1^2) - b_1 |\upsilon_1|^{\gamma+1} - d_1 |\theta_1|^{\gamma+1} \quad (47)$$

wherein $b_1 = s_1 \eta_1 - l_1 \vartheta_1/(\gamma+1)$, and $d_1 = l_1(1 - \gamma \vartheta_1^{-1/\gamma}/(\gamma+1))$;
step 2: a hierarchical type-2 fuzzy neural network is used to approximate the aforementioned unknown nonlinear function $f_2$ with high precision in the following form to solve the unknown nonlinear function:

$$f_2 = w_2^T \xi_2(\bullet) + \varepsilon_2(\bullet) \quad (48)$$

a second Lyapunov-candidate-function is selected as:

$$V_2 = V_1 + \frac{1}{2}\upsilon_2^2 + \frac{1}{2}\zeta_2^2 + \frac{1}{2}\theta_2^2 \quad (49)$$

the fractional-order derivative of $V_2$ is written as:

$${}^C D_{0,t}^\alpha V_2 \leq -k_1 \eta_1 \upsilon_1^2 - k_1 \eta_1 \theta_1^2 + \overline{\sigma} \eta_1 (\theta_1^2 + \Gamma_{2,1}^2)/2 + \sum_{i=1}^{2} b_i^2/2 + \gamma_1 \zeta_1 \zeta_1 -$$
$$d_1 |\theta_1|^{\gamma+1} + \upsilon_2 (\zeta_2 \upsilon_2 \xi_2^T(\cdot) \xi_2(\cdot)/2b_2^2 + u_2 + \varepsilon_2 + \overline{\sigma} \eta_1 z_1 - {}^C D_{0,t}^\alpha \alpha^c) -$$
$$\upsilon_2 \cdot {}^C D_{0,t}^\alpha \theta_2 + \theta_2 (\overline{\sigma} \eta_1 \theta_1 + {}^C D_{0,t}^\alpha \theta_2) + \zeta_2 (\upsilon_2^2 \xi_2^T(\cdot) \xi_2(\cdot)/2b_2^2 - {}^C D_{0,t}^\alpha \zeta_2) -$$
$$b_1 |\upsilon_2|^{\gamma+1} - \overline{\sigma} \eta_1 \upsilon_2 \theta_1 + \eta_1 \upsilon_1^2 \left(1/2 + \delta_1^2/2 - \left(\sqrt{1 + k_1^2 + \delta_1^2} - k_1\right)/\kappa_1^2\right) \quad (50)$$

wherein $\zeta_2=\|w_2\|^2$, and $b_2>0$;
the q-axis control input and the adaptive law and the compensation signal are designed as follows:

$$u_2 = -k_2 z_2 - \overline{\sigma}\eta_1 z_1 - \frac{\hat{\zeta}_2}{2b_2^2}\upsilon_2\xi_2^T(\cdot)\xi_2(\cdot) + {}^C D_{0,t}^\alpha \alpha_2^c - s_2\upsilon_2^\gamma + u_{o2} \quad (51)$$

$${}^C D_{0,t}^\alpha \hat{\zeta}_2 = \upsilon_2^2 \xi_2^T(\cdot)\xi_2(\cdot)/2b_2^2 - \gamma_2 \hat{\zeta}_2 \quad (52)$$

$${}^C D_{0,t}^\alpha \theta_2 = -k_2\theta_2 - \overline{\sigma}\eta_1\theta_1 - l_2\theta_2^\gamma \quad (53)$$

wherein $k_2>0$, $l_2>0$, $\gamma_2>0$ and $s_2>0$;
by equations (51)-(53), inequation (50) is further simplified as:

$${}^C D_{0,t}^\alpha V_2 \leq -k_1\eta_1\upsilon_1^2 - k_2\upsilon_2^2 - k_1\eta_1\theta_1^2 - k_2\theta_2^2 + \overline{\sigma}\eta_1(\theta_1^2 + \Gamma_{2,1}^2)/2 + \quad (54)$$

$$\sum_{i=1}^{2} b_i^2/2 + \sum_{i=1}^{2}\gamma_i\hat{\zeta}_i\tilde{\zeta}_i + \eta_1\upsilon_1^2\left(1/2 + \delta_1^2/2 - \left(\sqrt{1+k_1^2+\delta_1^2}-k_1\right)/\kappa_1^2\right) -$$

$$\sum_{i=1}^{2} d_i|\theta_i|^{\gamma+1} - \sum_{i=1}^{2} b_i|\upsilon_i|^{\gamma+1} + \upsilon_2^2\left(\frac{1}{2} - \frac{\delta_2^2}{2} - \frac{1}{\kappa_2^2}\left(\sqrt{1+k_2^2+\delta_2^2}-k_2\right)\right)$$

wherein $b_1=s_2-l_2\vartheta_2/(\gamma+1)$, and $d_2=l_2(1-\gamma\vartheta_2^{-1/\gamma}/(\gamma+1))$;
step 3: a hierarchical type-2 fuzzy neural network with very high precision and repeatability is used for estimation to process the unknown nonlinear function $f_3$:

$$f_3 = w_3^T \xi_3(\cdot) + \varepsilon_3(\cdot) \quad (55)$$

the magnetic field orientation control is adopted, so that $\alpha_3^c$ is equal to zero; a last Lyapunov candidate function is defined as:

$$V_3 = V_2 + \frac{1}{2}\upsilon_3^2 + \frac{1}{2}\tilde{\zeta}_3^2 + \frac{1}{2}\theta_3^2 \quad (56)$$

the fractional-order derivative of $V_3$ is calculated as:

$${}^C D_{0,t}^\alpha V_3 \leq -k_1\eta_1\upsilon_1^2 - k_2\upsilon_2^2 - k_1\eta_1\theta_1^2 - k_1\theta_2^2 + \overline{\sigma}\eta_1(\theta_1^2 + \Gamma_{2,1}^2)/2 + \quad (57)$$

$$\sum_{i=1}^{3} b_i^2/2 + \sum_{i=1}^{2}\gamma_i\hat{\zeta}_i\tilde{\zeta}_i - \sum_{i=1}^{2}d_i|\theta_i|^{\gamma+1} - \sum_{i=1}^{2}b_i|\upsilon_i|^{\gamma+1} + \theta_3 {}^C D_{0,t}^\alpha \theta_3 +$$

$$\upsilon_3(\hat{\zeta}_3\upsilon_3\xi_3^T(\cdot)\xi_3(\cdot)/2b_3^2 + u_3 + \varepsilon_3) + \tilde{\zeta}_3(\upsilon_3^2\xi_3^T(\cdot)\xi_3(\cdot)/2b_3^2 - {}^C D_{0,t}^\alpha \hat{\zeta}_3) +$$

$$\eta_1\upsilon_1^2\left(1/2 + \delta_1^2/2 - \left(\sqrt{1+k_1^2+\delta_1^2}-k_1\right)/\kappa_1^2\right) -$$

$$\upsilon_3 {}^C D_{0,t}^\alpha \theta_3 + \upsilon_2^2\left(1/2 + \delta_2^2/2 - \left(\sqrt{1+k_2^2+\delta_1^2}-k_2\right)/\kappa_2^2\right)$$

wherein $\zeta_3=\|w_3\|^2$, and $b_3>0$;
the d-axis control input, the adaptive law and the compensation signal are designed as follows:

$$u_3 = -k_3 z_3 - \hat{\zeta}_3\upsilon_3\xi_3^T(\cdot)\xi_3(\cdot)/2b_3^2 - s_3\upsilon_3^\gamma + u_{o3} \quad (58)$$

$${}^C D_{0,t}^\alpha \hat{\zeta}_3 = \upsilon_3^2 \xi_3^T(\cdot)\xi_3(\cdot)/2b_3^2 - \gamma_3\hat{\zeta}_3 \quad (59)$$

$${}^C D_{0,t}^\alpha \theta_3 = -k_3\theta_3 - l_3\theta_3^\gamma \quad (60)$$

wherein $k_3>0$, $l_3>0$, $\gamma_3>0$ and $s_3>0$;
obtaining:

$${}^C D_{0,t}^\alpha V_3 \leq -k_1\eta_1\upsilon_1^2 - \sum_{i=2}^{3}k_i\upsilon_i^2 - k_1\eta_1\theta_1^2 - \sum_{i=2}^{3}k_i\theta_i^2 + \quad (61)$$

$$\overline{\sigma}\eta_1(\theta_1^2+\Gamma_{2,1}^2)/2 + \eta_1\upsilon_1^2\left(1/2+\delta_1^2/2-\left(\sqrt{1+k_1^2+\delta_1^2}-k_1\right)/\kappa_1^2\right) -$$

$$\sum_{i=1}^{3}b_i|\upsilon_i|^{\gamma+1} + \sum_{i=2}^{3}\upsilon_i^2\left(\frac{1}{2} + \frac{\delta_i^2}{2} - \frac{1}{\kappa_i^2}\left(\sqrt{1+k_i^2+\delta_i^2}-k_i\right)\right) +$$

$$\sum_{i=1}^{3}b_i^2/2 + \sum_{i=1}^{3}\gamma_i\hat{\zeta}_i\tilde{\zeta}_i - \sum_{i=1}^{3}d_i|\theta_i|^{\gamma+1},$$

wherein $b_3=s_3-l_3\vartheta_3/(\gamma+1)$, and $d_3=l_3(1-\gamma\vartheta_3^{-1/\gamma}/(\gamma+1))$.

The present invention has the following beneficial effects:

Firstly, unlike an integer-order model of a single isolated permanent magnet synchronous generator, the present invention establishes a unidirectional coupling fractional-order permanent magnet synchronous generator synchronization model which can realize ordered and coordinated motion. The model can accurately describe the dynamic characteristics of the system, increasing the degree of freedom of design. Meanwhile, under the designed numerical method, dynamic analysis reveals the stable and unstable boundaries of the system along with the change of time, and illustrates the chaos and regular motion trend of the system along with the change of parameters.

Secondly, the present invention solves the problem of "complexity explosion" of the traditional backstepping control of a nonlinear system (even in a high-order system), processes the problem of infinite-time convergence in an exponential form and the problem of non-adjustable convergence speed between an initial stage and a steady-state stage, and simultaneously provides greater flexibility and better functional characteristics compared with a common fuzzy logic system and a neural network.

Thirdly, under a fractional-order backstepping framework, fuzzy finite-time optimal synchronous control of the unidirectional coupling fractional-order permanent magnet synchronous generator system is achieved, and the problems of finite-time convergence, unknown system nonlinear function, prescribed constraint conditions, minimum cost function and the like are solved.

Fourthly, additional advantages, objectives, and features of the present invention will be described below in the specification to some extent, and will be apparent to those skilled in the art upon the study of the following or may be learned from the practice of the present invention. The objectives and other advantages of the present invention will be realized and acquired through the following description of the specification.

BRIEF DESCRIPTION OF THE DRAWINGS

For a better understanding of the objectives, technical schemes and advantages of the present invention, details will be described below with reference to the accompanying drawings.

DETAILED DESCRIPTION

Figure 1:
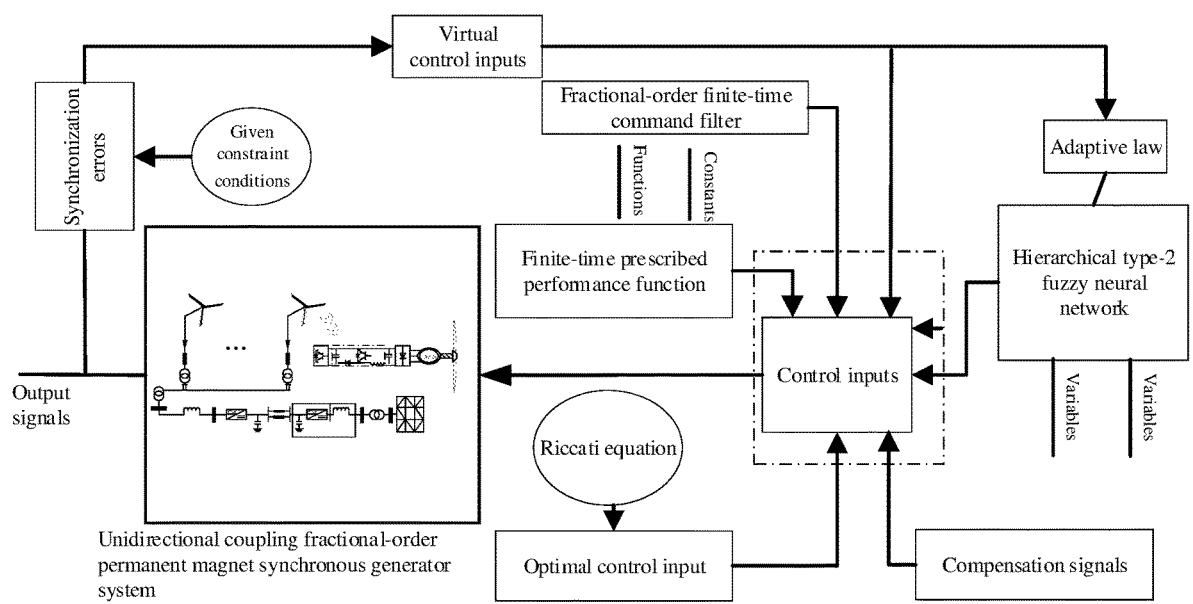
FIG. 1 is a schematic view of a wind energy conversion system.

The embodiments of the present invention are illustrated by specific examples below, and additional advantages and functions of the present invention will be readily apparent to those skilled in the art from the disclosure herein. The present invention can further be implemented or applied through different specific embodiments, and various details in this specification can be modified or changed based on different views and applications without departing from the spirit of the present invention. It should be noted that the drawings provided in the following embodiments are only for illustrating the basic idea of the present invention in a schematic way, and the features in the following embodiments and the embodiments of the present invention may be combined with each other without conflict.

The drawings are only for exemplary illustration, showing only schematic diagrams, not physical drawings, and cannot be understood as limiting the present invention. In order to better illustrate the embodiments of the present invention, some parts of the drawings may be omitted, enlarged or reduced, which does not represent the actual size of products. It is understood by those skilled in the art that some well-known structures in the drawings and descriptions thereof may be omitted.

1. System Modeling

As shown in FIG. 1, a wind energy conversion system consists of a wind turbine, a permanent magnet synchronous generator and three converters (a diode bridge rectifier, a DC/DC boost converter and an inverter in sequence). The electric energy generated by the permanent magnet synchronous generator is transmitted to a grid through the converters.

In combination with local aerodynamic characteristics, the power generated by the wind turbine is expressed as:

$$P_w = \frac{1}{2}\rho\pi C_p(\omega_r R/v_w, \beta)R^2 v_w^3 \tag{1}$$

wherein ρ, R, $\omega_r$, β, $\omega_r$ and $v_w$ represent air density, turbine radius, rotation speed, propeller blade angle, rotation speed and wind speed, respectively, and $C_p(\omega_r R/v_w,\beta)$ represents turbine power coefficient.

A mechanical fractional-order model of the permanent magnet synchronous generator is provided according to rotation law:

$$J\frac{d^\alpha \omega_r}{dt^\alpha} = T_g - b\omega_r - T_t \tag{2}$$

wherein, α, J, $T_t$, $T_g$, $\tilde{t}$ and b represent fractional-order coefficient, system inertia, turbine torque, generator torque, time and viscous friction coefficient, respectively.

The torque of an electromagnetic generator is expressed as:

$$T_g = \frac{3}{2}p((L_q - L_d)i_d i_q + i_q \phi) \tag{3}$$

wherein $L_d$ and $L_q$ represent d-axis inductance and q-axis inductance, respectively, $i_d$ and $i_q$ represent d-axis stator current and q-axis stator current, respectively, and p and ϕ represent the number of pole pairs and magnetic flux of permanent magnets in a three-phase permanent magnet synchronous generator, respectively.

The fractional-order model of the permanent magnet synchronous generator in a synchronous rotating d-q reference frame is expressed as:

$$\begin{cases} \frac{d^\alpha i_d}{dt^\alpha} = (-R_s i_d + \omega_r L_q i_q + V_d)/L_d, \\ \frac{d^\alpha i_q}{dt^\alpha} = (-R_s i_q - (L_d i_d + \phi)\omega_r + V_q)/L_q, \end{cases} \tag{4}$$

wherein $R_s$, $V_d$ and $V_q$ represent stator resistance, d-axis stator voltage and q-axis stator current, respectively.

In the Laplace domain, a fractional-order integrator in the form of linear approximation with a zero pole pair is represented by a transfer function with a slope of −20m dB/decade in a Bode diagram:

$$F(s) = \frac{1}{s^\alpha} \approx \prod_{i=0}^{N_f-1}(1+s/Q_i) \bigg/ \prod_{i=0}^{N_f-1}(1+s/P_i) \tag{5}$$

wherein $$N_f = \text{integer}\left(\frac{\log(\omega_{max}/p_f)}{\log\left(10^{d_f/10(1-\alpha)} \cdot 10^{d_f/10\alpha}\right)}\right) + 1,$$

and $P_f$, $\omega_{max}$ and $d_f$ represent difference values between angular frequency, bandwidth and actual line and approximate line, respectively; $Q_i$ and $P_i$ represent zero and pole of singularity function, respectively.

$L=L_d=L_q$ is obtained due to symmetrical stator windings. A fractional-order model of the permanent magnet synchronous generator is defined by equation (2) and equation (4) as follows:

$$\begin{cases} {}^C D_{0,t}^\alpha \omega_r = (3p\phi i_q/2 - b\omega_r - T_t)/J, \\ {}^C D_{0,t}^\alpha i_q = (-R_s i_q - (Li_d + \phi)\omega_r + V_q)/L, \\ {}^C D_{0,t}^\alpha i_d = (-R_s i_d + \omega_r Li_q + V_d)/L, \end{cases} \quad (6)$$

wherein ${}^C D_{0,t}^\alpha$ represents Caputo fractional-order derivative with $\alpha>0$ and starting point at origin.

By introducing new variables $x_1=L\omega_r/R_s$, $x_2=pL\phi i_q/bR_s$ and $x_3=pL\phi i_d/bR_s$, a normalized fractional-order model of a permanent magnet synchronous main motor may be expressed as:

$$\begin{cases} {}^C D_{0,t}^\alpha x_1 = \sigma x_2 - \rho x_1 + T_L, \\ {}^C D_{0,t}^\alpha x_2 = -x_2 - x_1 x_3 + \mu x_1 + u_q, \\ {}^C D_{0,t}^\alpha x_3 = -x_3 + x_1 x_2 + u_d, \end{cases} \quad (7)$$

wherein $t=\tilde{t}R_s/L$, $u_q=pL\phi V_q/bR_s^2$, $u_d=pL\phi V_d/bR_s^2$, $T_L=-L^2 T_t/JR_s^2$, $\mu=-p\phi^2/bR_s$, $\sigma=3Lb/2JR_s$ and $\rho=bL/JR_s$, and $x_1$, $x_2$, $x_3$, t, $u_q$, $u_d$ and $T_L$ represent normalized angular velocity, q-axis current, d-axis current, time, q-axis voltage, d-axis voltage and load torque, respectively; $\sigma$, $\rho$ and $\mu$ represent system parameters.

a fractional-order model of the driven permanent magnet synchronous generator is established by using a Heaviside function $H(t-T_g)$:

$$\begin{cases} {}^C D_{0,t}^\alpha y_1 = \sigma y_2 - \rho y_1 + T_L, \\ {}^C D_{0,t}^\alpha y_2 = -y_2 - y_1 y_3 + \mu y_1 + (\kappa_1(y_1-x_1) + \kappa_2(y_2-x_2)) \cdot \\ \qquad H(t-t_g) + u_q + u_2, \\ {}^C D_{0,t}^\alpha y_3 = -y_3 + y_1 y_2 + u_d + u_3 \end{cases} \quad (8)$$

wherein $t_g$, $\kappa_1$ and $\kappa_2$ represent primary synchronous time, the capacitance coupling and the resistance coupling, respectively, and $u_2$ and $u_3$ represent control inputs.

Synchronization errors are defined as $e_1=y_1-x_1$, $e_2=y_2-x_2$ and $e_3=y_3-x_3$. The following equation is obtained by subtracting equation (7) from equation (8):

$$\begin{cases} {}^C D_{0,t}^\alpha e_1 = \sigma e_2 - \rho e_1, \\ {}^C D_{0,t}^\alpha e_2 = -e_2 - y_1 y_3 + x_1 x_3 + \mu e_1 - (\kappa_1 e_1 + \kappa_2 e_2) H(t-t_g) + u_2, \\ {}^C D_{0,t}^\alpha e_3 = -e_3 + y_1 y_2 - x_1 x_2 + u_3. \end{cases} \quad (9)$$

Definition 1: for a sufficiently differentiable function $F(t)$, the Caputo fractional-order derivative is expressed as:

$$^C D_{0,t}^\alpha F(t) = \frac{1}{\Gamma(n-\alpha)} \int_0^t \frac{F^{(n)}(\tau)}{(t-\tau)^{1-n+\alpha}} d(\tau) \quad (10)$$

wherein $$\Gamma(n-\alpha) = \int_0^\infty e^{-t} t^{n-\alpha-1} dt$$

represents Euler gamma function, $n-1<\alpha<n$, and $n \in \mathbb{N}_+$.

A Laplace transform is performed on equation (10) to obtain:

$$L\{^C D_{0,t}^\alpha F(t)\} = s^\alpha L\{F(t)\} - \sum_{k=0}^{n-1} \frac{F^{(k)}(0)}{s^{k+1-\alpha}} \quad (11)$$

for any continuous function, when $0<\alpha<1$ and $F_1(t)$ and $F_2(t)$ are within an interval $[0,t_\zeta]$, the following equation is obtained:

$$F_1(t) \cdot {}^C D_{0,t}^\alpha F_2(t) + F_2(t) \cdot {}^C D_{0,t}^\alpha F_1(t) = {}^C D_{0,t}^\alpha (F_1(t) \cdot F_2(t)) + \frac{\alpha}{\Gamma(1-\alpha)} \int_0^t \frac{1}{(t-\varsigma)^{1-\alpha}} \left( \int_0^\varsigma \frac{F_1'(\varsigma_1) d\varsigma_1}{(t-\varsigma_1)^\alpha} \cdot \int_0^\varsigma \frac{F_2'(\varsigma_2) d\varsigma_2}{(t-\varsigma_2)^\alpha} \right) d\varsigma \quad (12)$$

when $F_1(t)=F_2(t)$, the following inequation is derived as:
$$^C D_{0,t}^\alpha (F^2(t)) \leq 2F(t) \cdot {}^C D_{0,t}^\alpha F(t) \quad (13)$$

Lamma 1: for any $x_s$, $y_s \in \mathbb{R}$, $\vartheta(x_s, y_s)$ is any positive real function and then the following inequation holds if $c_s>0$ and $d_s>0$.

$$|x_s|^{c_s}|y_s|^{d_s} \leq \frac{c_s \vartheta(x_s, y_s)|x_s|^{c_s+d_s}}{c_s+d_s} + \frac{d_s \vartheta(x_s, y_s)^{-\frac{c_s}{d_s}} |y_s|^{c_s+d_s}}{c_s+d_s} \quad (14)$$

Definition 2: a minimum performance cost function is as follows:

$$\bar{J} = \int_0^\infty (\bar{Q}(\bar{S}(t)) + U^T \bar{R} U) dt \quad (15)$$

wherein $\bar{S}$, $U$ and $\bar{R}$ represent a penalty function, an optimal control input and an N-order matrix, respectively, and $\bar{Q}(\bar{S})>0$.

2. Dynamic Analysis and Problem Raising

This section performs a dynamic analysis on the fractional-order driving/driven permanent magnet synchronous generator to reveal its dynamic characteristics. At present, it is difficult to obtain an explicit solution to the nonlinear fractional-order differential equation. The present invention, by using an integration rule, designs a numerical method and applies the numerical method to solve a nonlinear fractional-order system.

For a general fractional-order differential equation ${}^C D_{0,t}^\alpha y_f(t) = g(t, y_f(t))$, $t \geq 0$ with a given function $g(\cdot,\cdot)$, the fractional-order derivative quotient of $y_f(t)$ is defined as an infinite series, i.e., $$^C D_{0,t}^\alpha y_f(t) = \lim_{h \to 0} \frac{1}{h^\alpha} \sum_{j=0}^{[t/h]} \omega_j^{(\alpha)}(y_f(t-jh) - y_f(0)), \omega_j^{(\alpha)} = (-1)^j \binom{\alpha}{j} \quad (16)$$

wherein h>0 and $\omega_j^{(\alpha)}$ represent step size and coefficient, respectively, and a condition based on the Euler-Gamma function is satisfied as follows:

$$\binom{\alpha}{j} = \begin{cases} \Gamma(\alpha+1)/\Gamma(\alpha+1-j)j! & J=0,\ldots,\alpha, \\ 0 & j > \alpha. \end{cases} \quad (17)$$

An equidistant grid $t_n$=nh, n=0, 1, • • •, N is defined in an interval [0 T], wherein N=T/h. An integral expression is then obtained when $t=t_n$.

$$y_f(t_n) = y_{f_0} + \frac{1}{\Gamma(\alpha)} \sum_{j=0}^{n-1} \int_{t_j}^{t_{j+1}} (t_n - \tau)^{\alpha-1} g(\tau, y_f(\tau)) d\tau \quad (18)$$

A vector field $g(\tau, y_f(\tau))$ is approximated by a constant $g(t_j, y_{f_j})$ over each subinterval $[t_j, t_{j+1}]$. A numerical value of equation (18) is approximately rewritten as:

$$y_f(t_n) = y_{f_0} + h^\alpha \sum_{j=0}^{n-1} \frac{((n-j)^\alpha - (n-j-1)^\alpha)}{\Gamma(\alpha+1)} g(t_j, y_{f_j}) \quad (19)$$

System parameters of the fractional-order model of the driving/driven permanent magnet synchronous generator are set to be three working conditions:
working condition 1: $\alpha$=0.99, $\sigma$=3, $\rho$=4, $\mu$=25, $T_L$=0, and the initial conditions are $x_1(0)$=0.1, $x_2(0)$=0.9, and $x_3(0)$=20;
working condition 2: $\alpha$=0.99, $\sigma$=17, $\rho$=16, $\mu$=25, $T_L$=0, and the initial conditions are $x_1(0)$=1.5, $x_2(0)$=0.5, and $x_3(0)$=20; and
working condition 3: $\alpha$=0.99, $\sigma$=5.5, $\rho$=5.5, $\mu$=20, $T_L$=0, and the initial conditions are $x_1(0)$=0.1, $x_2(0)$=0.1, and $x_3(0)$=3.

Approximate transfer functions of different fractional-orders are given by introducing equation (5):

$$\frac{1}{s^{0.998}} = \frac{9.95405(1+9.65984\times 10^{-10}s)(1+9.8853\times 10^{-5}s)}{(1+9.43952\times 10^{-10}s)(1+9.65984\times 10^{-5}s)(1+9.8853s)} \quad (20)$$

$$\frac{1}{s^{0.992}} = \frac{9.81748(1+9.32735\times 10^{-5}s)(1+0.0308972s)}{(1+8.90424\times 10^{-5}s)(1+0.0294957s)(1+9.77056s)} \quad (21)$$

$$\frac{1}{s^{0.98}} = \frac{(9.54993(1+7.90604\times 10^{-6}s)(1+0.000868511s)(1+0.0954095s)}{(1+7.19686\times 10^{-6}s)(1+0.000790604s)(1+0.0868511s)(1+9.54s)} \quad (22)$$

error values in the above equations are ≤6.1 dB, ≤0.2 dB and ≤0.4 dB, respectively.

The permanent magnet synchronous generator generates chaotic oscillation with two attractors. In order to demonstrate the advantages of the fractional-order model, and reveal the dynamic characteristics of the permanent magnet synchronous generator-related to the fractional-order value, the fractional-order value is set as 0.96, and the periodic motion of the permanent magnet synchronous generator is immediately switched to a chaotic track with an attractor. In the working condition 1, the system has two motion states of T-time periodic behavior and chaotic attractors when $\alpha$=0.97. In the working condition 2, the motion behavior of the permanent magnet synchronous generator becomes chaotic oscillation with two attractors when $\alpha$=0.98. Finally, whether in the working condition 1 or in the working condition 2, once a is increased to 0.992 or 0.998, the system motion is maintained in the chaotic oscillation state with two attractors.

Figure 2:
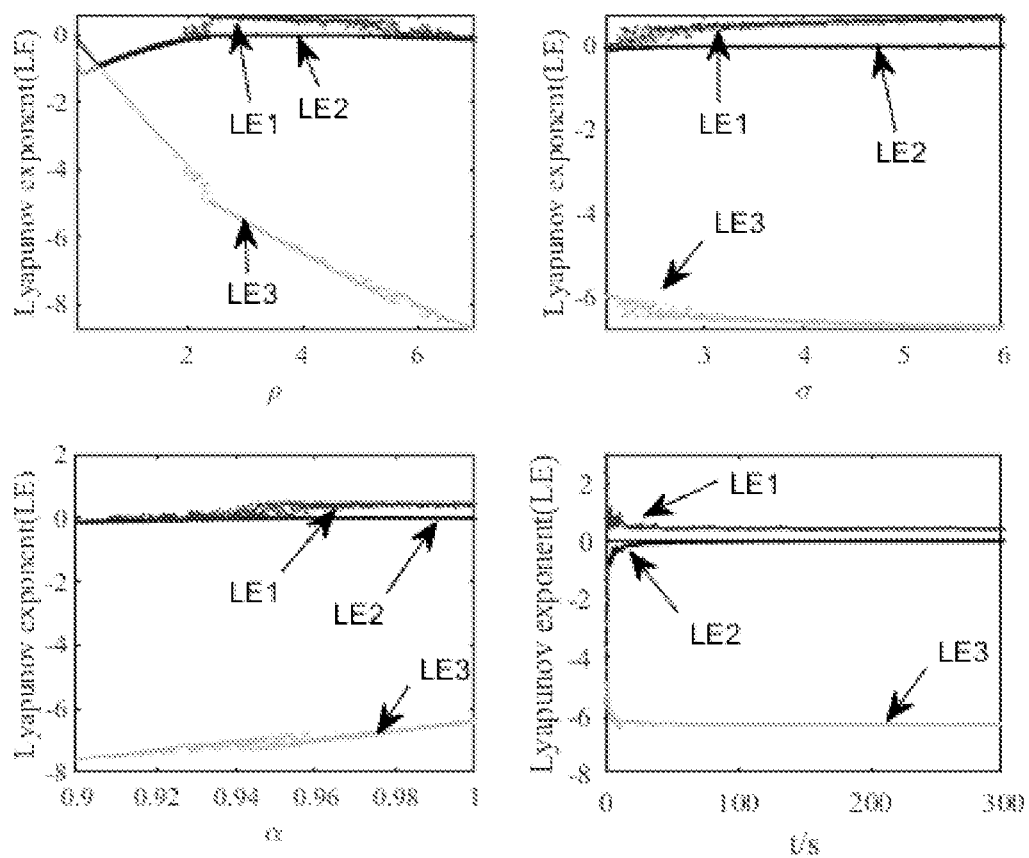
FIG. 2 is diagrams of the relationship between Lyapunov exponent and system parameters ($\sigma$, $\rho$), fractional-order and time under working condition 1.
Figure 3:
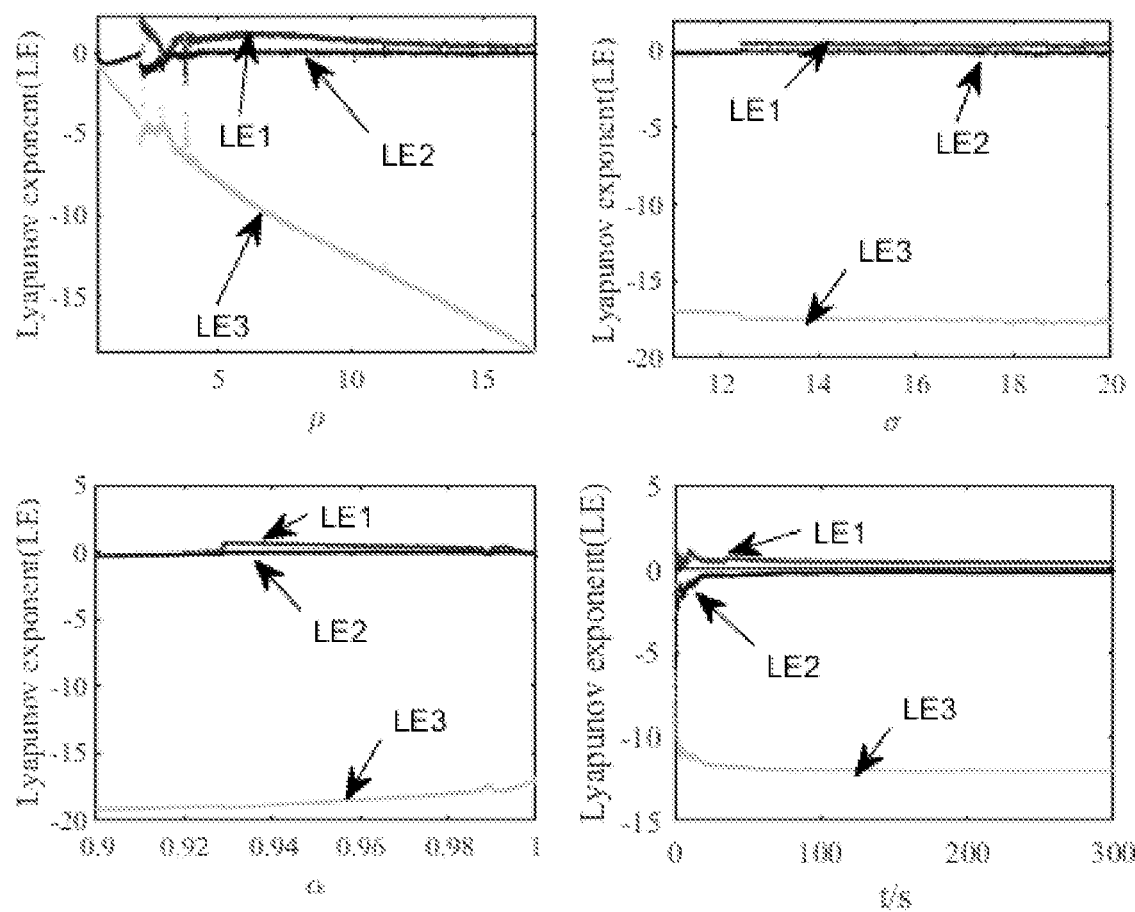
FIG. 3 is diagrams of the relationship between Lyapunov exponent and system parameters (σ, ρ), fractional-order and time under working condition 2.
Figure 4A:
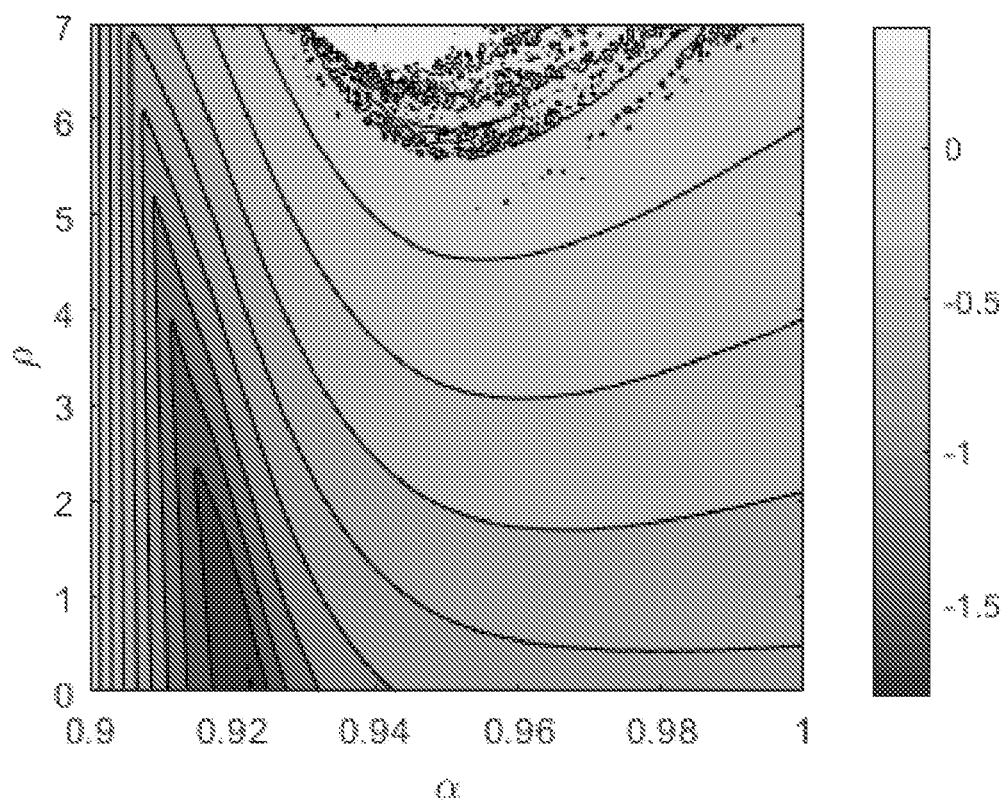
FIG. 4A is contour maps of the maximum Lyapunov exponent related to chaotic oscillation in α-ρ parameter plane under working condition 1.
Figure 4B:
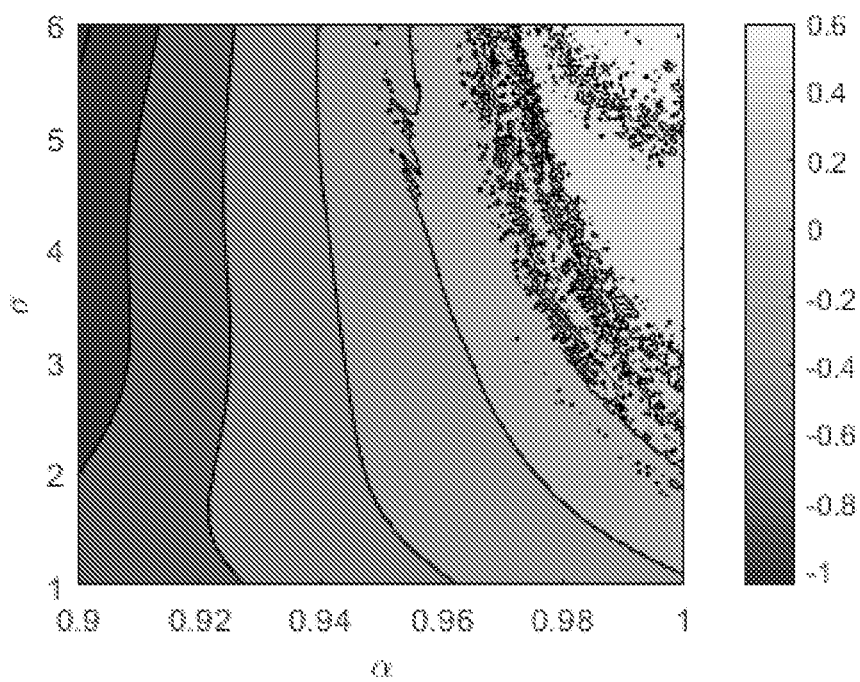
FIG. 4B is contour maps of the maximum Lyapunov exponent related to chaotic oscillation in α-σ parameter plane under working condition 1.
Figure 4C:
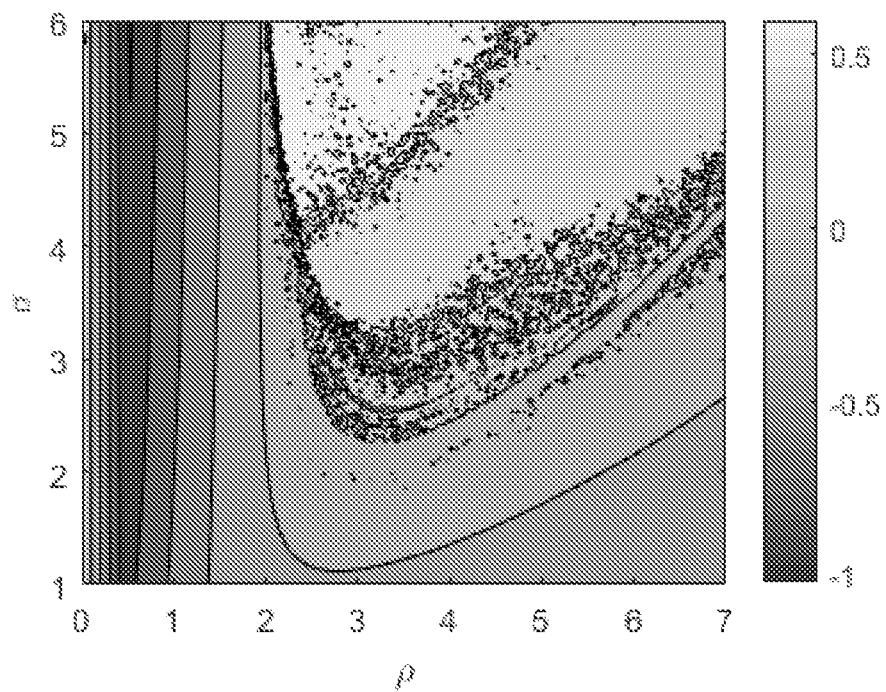
FIG. 4C is contour maps of the maximum Lyapunov exponent related to chaotic oscillation in α-ρ parameter plane under working condition 1.
Figure 5A:
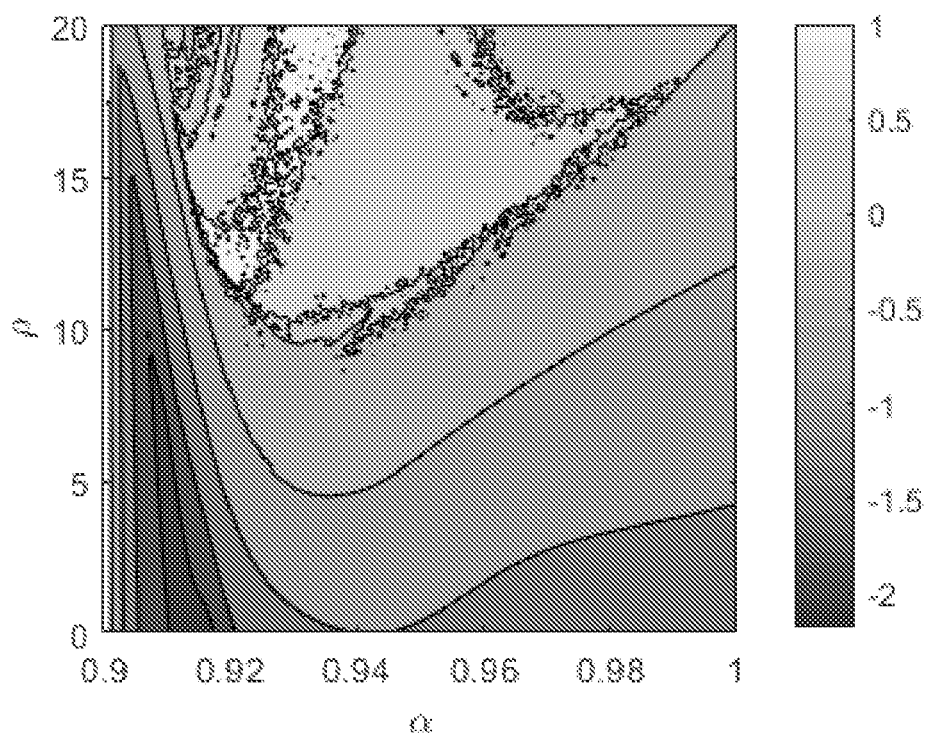
FIG. 5A is contour maps of the maximum Lyapunov exponent related to chaotic oscillation in α-ρ parameter plane under working condition 2.
Figure 5B:
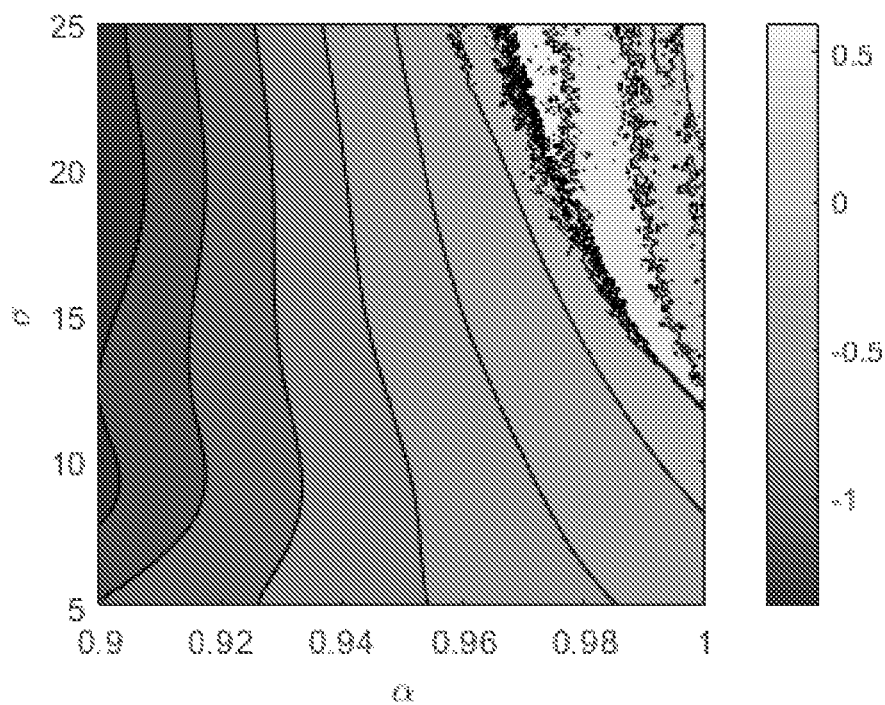
FIG. 5B is contour maps of the maximum Lyapunov exponent related to chaotic oscillation in α-σ parameter plane under working condition 2.
Figure 5C:
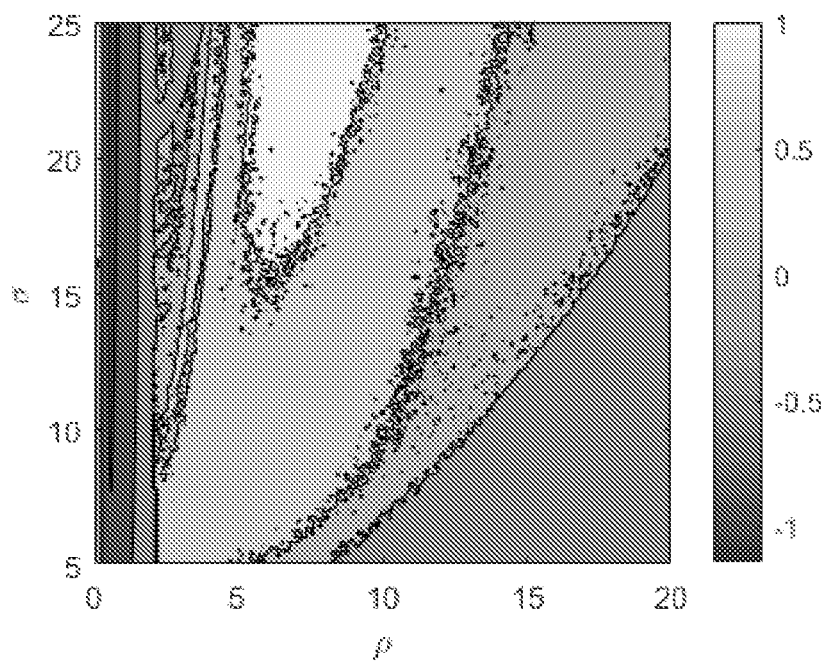
FIG. 5C is contour maps of the maximum Lyapunov exponent related to chaotic oscillation in α-ρ parameter plane under working condition 2.

FIGS. 2-3 show the relationship between the Lyapunov exponent and system parameters ($\sigma$, $\rho$), fractional-order and time under the working conditions 1-2. In the first sub-diagram in FIG. 2, the permanent magnet synchronous generator generates chaotic oscillation when $\rho \in$ (2 6.5). In the second sub-diagram in FIG. 2, the permanent magnet synchronous generator is in the chaotic state when a is set in the interval [2.1 6]. The third sub-diagram in FIG. 2 reveals that chaotic oscillation can be triggered when the fractional-order is in the interval (0.912 1). It can be seen from the last sub-diagram in FIGS. 2-3 that the permanent magnet synchronous generator is always in the chaotic state in the whole process. In the first sub-diagram in FIG. 3, the permanent magnet synchronous generator is in the chaotic state when $\rho \in$(2 16). It is noted that there is a switching point between the periodic state and chaotic oscillation. In the second sub-diagram in FIG. 3, the permanent magnet synchronous generator generates chaotic oscillation when a is set in the interval [12.4 20]. It is seen from the third sub-diagram in FIG. 3 that the fractional-order value, when $\alpha$>0.928, causes chaotic oscillation of the permanent magnet synchronous generator.

FIGS. 4A, 4B, 4C, 5A, 5B & 5C are contour maps of the maximum Lyapunov exponent related to stability and instability boundaries in $\alpha$-$\rho$, $\alpha$-$\sigma$ and $\alpha$-$\rho$ parameter planes under the working conditions 1-2. The colored bars in each sub-diagram represent the intervals that generate chaos between these two parameters such as $\alpha$-$\rho$, $\alpha$-$\sigma$ and $\sigma$-$\rho$. It is clear that the Lyapunov exponent is the greatest in the lemon yellow region. That is, when the combination of the three parameters falls in the lemon yellow region, the permanent magnet synchronous generator generates chaotic oscillation. Chaotic oscillation is applied in many scenarios. However, in the case of a permanent magnet synchronous generator, such oscillations can lead to a reduction in the performance of the operating system and even to the burning of the motor and its surrounding components. Therefore, it is necessary to provide an effective method for suppressing chaotic oscillation. Meanwhile, when a high-dimensional hyperchaotic system is faced, type-1 fuzzy neural network has poor approximation precision. How to further improve the stability time and dynamic performance of the unidirectional coupling fractional-order permanent magnet synchronous generator when the cost function is minimized is still a problem.

3. Fuzzy Finite-Time Optimal Controller Design 3.1. Hierarchical Type-2 Fuzzy Neural Network The hierarchical type-2 fuzzy neural network is a derivative of a type-1 fuzzy neural network and has strong learning capability, function approximation capability and fault-tolerant capability. The hierarchical type-2 fuzzy neural network consists of an input layer, a membership layer, a rule layer, a type-reduction layer and an output layer. At the second level, upper and lower membership levels are written as:

$$\bar{\mu}_{A_i^j}(x_i) = \exp(-((x_i - m_{A_i^j})/\bar{\sigma}_{A_i^j})^2/2),$$

$$\underline{\mu}_{A_i^j}(x_i) = \exp(-((x_i - m_{A_i^j})/\underline{\sigma}_{A_i^j})^2/2), i=1, \cdots, N \quad (23)$$

wherein $m_{A_i^j}$, $\bar{\sigma}_{A_i^j}$ and $\underline{\sigma}_{A_i^j}$ represent a center, an upper width and a lower width of the $j^{th}$ membership level of the $i^{th}$ input, respectively.

In the rule layer, an upper/down trigger rule is calculated as:

$$\bar{T}_{ac}^j = \bar{\mu}_{A_1}{}^a(x_1)\bar{\mu}_{A_2}{}^c(x_2), \underline{T}_{ac}^j = \underline{\mu}_{A_1}{}^a(x_1)\underline{\mu}_{A_2}{}^c(x_2) \quad (24)$$

In the fourth layer, $Y_R$ and $Y_L$ are expressed in the form of a set type-reduction center as:

$$Y_R = \frac{\sum_{j=1}^{M} R^j \underline{T}^j w_R^j + \sum_{j=r+1}^{M} (1-R^j)\bar{T}^j w_R^j}{\sum_{j=1}^{M} R^j \underline{T}^j w_R^j + \sum_{j=r+1}^{M} (1-R^j)\bar{T}^j} \quad (25)$$

$$Y_L = \frac{\sum_{j=1}^{M} L^j \bar{T}^j w_L^j + \sum_{j=l+1}^{M} (1-L^j)\underline{T}^j w_L^j}{\sum_{j=1}^{M} L^j \bar{T}^j + \sum_{j=l+1}^{M} (1-L^j)\underline{T}^j}$$

wherein $w_R^j$ and $w_L^j$ are referred as weight, $\underline{T}^j$ and $\bar{T}^j$ represent upper and lower trigger degrees of the $j^{th}$ rule, M represents the number of fuzzy rules, $$R \equiv \begin{bmatrix} 1 & \cdots & 1 & 0 & \cdots & 0 \\ \vdots & \vdots & \vdots & \vdots & \vdots & \vdots \\ 1 & \cdots & r & r+1 & \cdots & M \end{bmatrix} \in \mathbb{R}^M, \text{ and } L \equiv \begin{bmatrix} 1 & \cdots & 1 & 0 & \cdots & 0 \\ \vdots & \vdots & \vdots & \vdots & \vdots & \vdots \\ 1 & \cdots & l & l+1 & \cdots & M \end{bmatrix} \in \mathbb{R}^M;$$

In the output layer, the fuzzy output in the form of vector is derived as:

$$Y = w^T \xi = w_R^T \xi_R + w_L^T \xi_L \quad (26)$$

wherein, $$w \equiv [w_R \ w_L], w_R \equiv \frac{1}{2}[w_R^1 \ \cdots \ w_R^M]^T, w_L \equiv \frac{1}{2}[w_L^1 \ \cdots \ w_L^M]^T,$$

$$\xi_R \equiv \left[\frac{R^1 \underline{T}^1 + (1-R^1)\bar{T}^1}{\sum_{j=1}^{M} R^j \underline{T}^j + \sum_{j=r+1}^{M} (1-R^j)\bar{T}^j} \cdots \frac{R^M \underline{T}^M + (1-R^M)\bar{T}^M}{\sum_{j=1}^{M} R^j \underline{T}^j + \sum_{j=r+1}^{M} (1-R^j)\underline{T}^j}\right]^T,$$

$$\xi_L \equiv \left[\frac{L^1 \underline{T}^1 + (1-L^1)\bar{T}^1}{\sum_{j=1}^{M} L^j \underline{T}^j + \sum_{j=r+1}^{M} (1-L^j)\bar{T}^j} \cdots \frac{L^M \underline{T}^M + (1-L^M)\bar{T}^M}{\sum_{j=1}^{M} L^j \underline{T}^j + \sum_{j=r+1}^{M} (1-L^j)\underline{T}^j}\right]^T,$$

$$\xi \equiv [\xi_R \ \xi_L].$$

By calling equation (26), the hierarchical type-2 fuzzy neural network realizes high-precision approximation to any unknown but bounded function on a compact set, then $$\sup_{X \in D_X} |h(X) - w^T \xi(X)| \leq \cup \varepsilon(X) \quad (27)$$

wherein $X \equiv [x_1 \cdots x_i]^T \in \mathbb{R}^i$, $i=1 \cdots N$, N represents the number of inputs, $\varepsilon(X)>0$ represents approximation errors, and $\Omega_w$ and $D_X$ are compact sets of appropriate bounds of w and X, respectively. An optimal parameter w* is introduced, and the parameter meets the condition:

$$\arg \min_{w \in \Omega_w} \left[\sup_{X \in D_X} |h(X) - \hat{h}(X, w)|\right],$$

and $\hat{h}$ represents approximation values of $h \cdot \tilde{w} = w - w^*$ is defined, wherein w* represents an amount of labor for analysis.

In order to avoid exponential increase of the number of rules, two criteria of tracking error reduction rate and fuzzy rule a completeness are adopted to execute the structural adjustment of the hierarchical type-2 fuzzy neural network. The tracking error reduction rate is equivalent to the derivative of the square of tracking errors between a drive system output and a response system. The completeness of the fuzzy rule is defined as that "at least one fuzzy rule ensures that the trigger strength within an operation range is not less than ε". If the membership grade is equal to or greater than 0.5 in the hierarchy structure, the membership grade is saved. Otherwise, these unimportant rules in a self-structure algorithm is deleted.

In order to improve solving speed and simplify the structure, the hierarchical type-2 fuzzy neural network is transformed as follows:

$$w^T \xi(X) \leq \zeta \xi^T(X) \xi(X)/2b^2 + b^2/2 \quad (28)$$

wherein $\zeta = \|w\|^2$, and $b > 0$, $\tilde{\zeta} = \zeta - \hat{\zeta}$, wherein $\hat{\zeta}$ represents estimate values of $\zeta$.

Note 1: compared to Grunwald-Letnikov and Riemann-Liouville derivatives, the initial conditions of Caputo derivatives of the fractional-order differential equation have the same form as the initial conditions of the integer-order differential equation. When the Caputo derivative is applied to a constant, its value is zero. Thus, ${}^C D_{0,t}^\alpha \tilde{\zeta} = -{}^C D_{0,t}^\alpha \hat{\zeta}$ is obtained directly.

3.2. Controller Design

In order to avoid system performance degradation and suppress the convergence characteristics of error variables, a positive and strictly monotonically decreasing finite-time prescribed performance function is designed:

$$\beta(t) = \begin{cases} a_3 t^3 + a_2 t^2 + a_1 t + a_0, & t \in [0, T_0) \\ \beta_{T_0}, & t \geq T_0 \end{cases} \quad (29)$$

wherein $a_i$, $i=0, \cdots, 3$ represents design parameters, and $T_0$ and $\beta_{T_0}$ represent convergence time and convergence boundary, respectively. Meanwhile, the performance function satisfies the following constraints:

$$\begin{cases} \beta(0) = \beta_0, & {}^C D^\alpha \beta(0) = 0, \\ \beta(t \mid t \geq T_0) = \beta_{T_0}, & {}^C D^\alpha \beta(t \mid t \geq T_0) = 0, \end{cases} \quad (30)$$

wherein $\beta_0$ represents the initial value of the finite-time prescribed performance function.

Note 2: when a constraint signal is matched with the convergence rate of the prescribed performance function, a constraint condition suppresses a large overshoot of the control output at an initial stage. For the pre-given parameters such as $\beta_0$, $T_0$ and $\beta_{T_0}$, a satisfactory finite-time prescribed performance function is easily obtained by appropriate selection of four design parameters.

In order to achieve a faster response, a fractional-order finite-time command filter based on a first order Levant differentiator is provided:

$$\begin{cases} {}^C D_{0,t}^{\alpha} Z_{i,1} = \bar{Z}_{i,1}, \\ \bar{Z}_{i,1} = -c_{i,1} |Z_{i,1} = \alpha_r|^{\frac{1}{2}} \text{sign}(Z_{i,1} - \alpha_r) + Z_{i,2} \\ {}^C D_{0,t}^{\alpha} Z_{i,2} = -c_{i,2} \text{sign}(Z_{i,2} - \bar{Z}_{i,1}), i = 1, \ldots, N \end{cases} \quad (31)$$

wherein $Z_{i,1} \in \mathbb{R}$ and $Z_{i,2} \in \mathbb{R}$ represent states of the command filter, $\alpha_r \in \mathbb{R}$ represents input signals of the command filter, $c_{i,1}$ and $c_{i,2}$ represent positive design constants, and positive constants $\Gamma_{i,1}$ and $r_{i,2}$ satisfy conditions $|Z_{i,1} - \alpha_r| \leq \Gamma_{i,1}$ and $|Z_{i,1} - {}^C D_{0,t}^{\alpha} \alpha_r| \leq \Gamma_{i,2}$.

Obviously, by appropriate selection of $c_{i,1}$ and $c_{i,2}$, $Z_{i,1} = \alpha_r$ and $\bar{Z}_{i,1} = {}^C D_{0,t}^{\alpha} \alpha_r$ when input noises are completely suppressed during transients of limited time.

Error variables are introduced:

$$z_2 = e_2 - \alpha_2^c, \; z_3 = e_3 - \alpha_3^c \quad (32)$$

wherein $\alpha_i^c$, i=2, 3 and $Z_{i,1}$, i=2, 3 are the same, representing the output of the fractional-order command filter.

The compensated tracking error is represented as:

$$\upsilon_i = z_i - \theta_i, \; i=1,2,3 \quad (33)$$

wherein $\theta_i$ represents a compensation signal between virtual control and filtered signals.

The error variables have the following inequation:

$$-\underline{\rho}\beta(t) < e_1 < \bar{\rho}\beta(t), \forall t \geq 0 \quad (34)$$

wherein $0 < \underline{\rho}, \bar{\rho} \leq 1$.

A smooth and invertible function $S_1(z_1)$ is defined, and the above inequation is rewritable to an unconstrained form:

$$e_1 = \beta(t) S_1(z_1) \quad (35)$$

It is noted that $(\bar{\rho} e^z - \underline{\rho} e^{-z})/(e^z + e^{-z})$ belongs to one of the above-described smooth and invertible functions.

Then the inverse transform of equation (35) is written as:

$$z_1 = S_1^{-1}(\phi(t)) \quad (36)$$

wherein $\phi_1(t) = e_1(t)/\beta(t)$.

The fractional-order derivative of equation (36) is derived as:

$${}^C D_{0,t}^{\alpha} z_1 = \beta^{-1}(t) \cdot {}^C D_{\phi(t)}^{\alpha} S_1^{-1}(\bullet)({}^C D_{0,t}^{\alpha} e_1(t) - \phi_1(t) {}^C S_{0,t}^{\alpha \beta(t)})) = \eta_1({}^C D_{0,t}^{\alpha} e_1 - r_1), \quad (37)$$

wherein $\eta_1 = \beta^{-1}(t) \cdot {}^C D_{\phi(t)}^{\alpha} S_1^{-1}(\phi(t))$, and $r_1 = \phi_1(t) {}^C D_{0,t}^{\alpha} \beta(t)$.

By using equations (9) and (37), then:

$${}^C D_{0,t}^{\alpha} z_1 = \eta_1(f_1 + \sigma e_2 - r_1), \; {}^C D_{0,t}^{\alpha} e_2 = f_2 + u_2, \; {}^C D_{0,t}^{\alpha} e_3 = f_3 + u_3 \quad (38)$$

$f_1 = -\rho e_1$, $f_2 = -e_2 - y_1 y_3 + x_1 x_3 - (\kappa_1 e_1 + \kappa_2 e_2) H(t - t_g) + \mu e_1$ and $f_3 = -e_3 - y_1 y_2 - x_1 x_2$ are all regarded as unknown nonlinear functions due to perturbations from wind speeds, generator temperatures, stator resistance, friction coefficient, workload, and the like.

The design of the controller comprises the following three steps based on a fractional-order backstepping control principle.

Step 1: the above-described hierarchical type-2 fuzzy neural network is adopted to perform estimation on a compact set for facilitating controller design considering the uncertainty of $f_1$, i.e., $$f_1 = w_1^T \xi_1(\bullet) + \varepsilon_1(\bullet) \quad (39)$$

wherein ($\bullet$) represents abbreviations of $(x_1, x_2, x_3)$.

A first Lyapunov-candidate-function is selected as:

$$V_1 = \frac{1}{2}\upsilon_1^2 + \frac{1}{2}\zeta_1^2 + \frac{1}{2}\theta_1^2 \quad (40)$$

the fractional-order derivative of $v_1$ is taken to obtain:

$${}^C D_{0,t}^{\alpha} V_1 \leq \upsilon_1 \eta_1 [f_1 + \bar{\sigma}(z_2 + \alpha_2^v + \alpha_2^c - \alpha_2^v) - r_1] - \upsilon_1 {}^C D_{0,t}^{\alpha} \theta_1 - \zeta_1 {}^C D_{0,t}^{\alpha} \zeta_1 + \theta_1 {}^C D_{0,t}^{\alpha} \theta_1,$$
$$\leq \upsilon_1 \eta_1 [\upsilon_1 \eta_1 \zeta_1 \xi_1^T(\bullet)\xi_1(\bullet)/2b_1^2 + \varepsilon_1 + \bar{\sigma} z_2 + \bar{\sigma}\alpha_2^v +$$
$$\bar{\sigma}(\alpha_2^c - \alpha_2^v) - r_1] - \upsilon_1 {}^C D_{0,t}^{\alpha} \theta_1 + \theta_1 {}^C D_{0,t}^{\alpha} \theta_1 + b_1^2/$$
$$2 + \zeta_1 (\upsilon_1^2 \eta_1^2 \xi_1^T(\bullet)\xi_1(\bullet)/2b_1^2 - {}^C D_{0,t}^{\alpha} \zeta_1) \quad (41)$$

wherein $\alpha_2^v$ and $\bar{\sigma}$ represent virtual control and $\sigma$ upper bound, respectively, and $\zeta_1 = \|w_1\|^2$ and $b_1 > 0$.

The following cost function is designed to achieve its minimum value by definition 2.

$$J_i = \int_0^{\infty} (\upsilon_i^2 + \delta_1^2 \upsilon_i^2 + \kappa_i^2 u_{oi}^2) dt, \; i=2, 3 \quad (42)$$

In the above equation, $u_{oi}$, $\delta_i^2$ and $\kappa_i$ represent an optimal control input, a normal constant and a design parameter, respectively. The following inequation $\xi_i^2(\bullet) \leq \delta_i^2 \upsilon_i^2$, i=1, 2, 3 is used in order to compensate estimation errors of the hierarchical type-2 fuzzy neural network.

The optimal control input is designed as $u_{oi} = -P_i \upsilon_i / \kappa_i^2$, i=1, 2, 3, wherein $P_i$ is the solution of an algebraic Riccati equation $P_i^2 + 2k_i P_i - \kappa_i^2 - 1 = 0$, $k_i > 0$.

The optimal control input is then further derived as:

$$u_{oi} = -(\sqrt{1 + k_i^2 + \delta_i^2} - k_i)\upsilon_i / \kappa_i^2, \; i=1,2,3 \quad (43)$$

Virtual control, and an adaptive law and a compensation signal thereof are selected:

$$\alpha_2^v = (-k_1 z_1 - \upsilon_1 \eta_1 \zeta_1 \xi_1^T(\bullet)\xi_1(\bullet)/2b_1^2 + r_1 - s_1 \upsilon_1^{\gamma} + u_{oi})/\bar{\sigma} \quad (44)$$

$${}^C D_{0,t}^{\alpha} \zeta_1 = \upsilon_1^2 \eta_1^2 \xi_1^T(\bullet)\xi_1(\bullet)/2b_1^2 - \gamma_1 \zeta_1 \quad (45)$$

$${}^C D_{0,t}^{\alpha} \theta_1 = -k_1 \eta_1 \theta_1 + \bar{\sigma}\eta_1(\alpha_2^c - \alpha_2^v) + \theta_2) - l_1 \theta_1^{\gamma} \quad (46)$$

wherein $k_1 > 0$, $l_1 > 0$, $\gamma_1 > 0$, $s_1 > 0$, and $0 < \gamma < 1$.

Equations (44)-(46) are substituted into inequation (41) by inequation (14) to obtain:

$${}^C D_{0,t}^{\alpha} V_1 \leq -k_1 \eta_1 \upsilon_1^2 - k_1 \eta_1 \theta_1^2 + \bar{\sigma}\eta_1 \upsilon_1 \upsilon_2 + \bar{\sigma}\eta_1 \theta_1 \theta_2 +$$
$$\bar{\sigma}\eta_1(\theta_1^2 + \Gamma_{2,1}^2)/2 + b_1^2/2 + \gamma_1 \zeta_1 \zeta_1 + \eta_1 \upsilon_1^2 (\frac{1}{2} + \delta_1^2/2 - ($$
$$\sqrt{1 + k_1^2 + \delta_1^2} - k_1)/\kappa_1^2) - b_1 |\upsilon_1|^{\gamma+1} - d_1 |\theta_1|^{\gamma+1} \quad (47)$$

wherein $b_1 = s_1 \eta_1 - l_1 \vartheta_1 / (\gamma + 1)$, and $d_1 = l_1(1 - \gamma \vartheta_1^{-1/\gamma}/(\gamma + 1))$.

Step 2: a hierarchical type-2 fuzzy neural network is used to approximate the aforementioned unknown nonlinear function $f_2$ with high precision in the following form to solve the unknown nonlinear function:

$$f_2 = w_2^T \xi_2(\bullet) + \varepsilon_2(\bullet) \quad (48)$$

A second Lyapunov-candidate-function is selected as:

$$V_2 = V_1 + \frac{1}{2}\upsilon_2^2 + \frac{1}{2}\zeta_2^2 + \frac{1}{2}\theta_2^2 \quad (49)$$

The fractional-order derivative of $V_2$ is written as:

$${}^C D_{0,t}^{\alpha} V_2 \leq -k_1 \eta_1 \upsilon_1^2 - k_1 \eta_1 \theta_1^2 + \bar{\sigma}\eta_1(\theta_1^2 + \Gamma_{2,1}^2)/2 + \sum_{i=1}^{2} b_i^2/2 + \gamma_1 \hat{\zeta}_1 \zeta_1 - \quad (50)$$
$$d_1 |\theta_1|^{\gamma+1} + \upsilon_2(\hat{\zeta}_2 \upsilon_2 \xi_2^T(\cdot)\xi_2(\cdot)/2b_2^2 + u_2 + \varepsilon_2 + \bar{\sigma}\eta_1 z_1 - {}^C D_{0,t}^{\alpha} \alpha^c) -$$

-continued $$u_2 \cdot {}^C D_{0,t}^\alpha \theta_2 + \theta_2(\overline{\sigma}\eta_1\theta_1 + {}^C D_{0,t}^\alpha \theta_2) + \hat{\zeta}_2(\upsilon_2^2 \xi_2^T(\cdot)\xi_2(\cdot)/2b_2^2 - {}^C D_{0,t}^\alpha \hat{\zeta}_2) -$$

$$b_1|\upsilon_2|^{\gamma+1} - \overline{\sigma}\eta_1\upsilon_2\theta_1 + \eta_1\upsilon_1^2\left(1/2 + \delta_1^2/2 - \left(\sqrt{1 + k_1^2 + \delta_1^2} - k_1\right)/\kappa_1^2\right)$$

wherein $\zeta_2 = \|w_2\|^2$, and $b_2 > 0$.

The q-axis control input and the adaptive law and the compensation signal are designed as follows:

$$u_2 = -k_2 z_2 - \overline{\sigma}\eta_1 z_1 - \frac{\hat{\zeta}_2}{2b_2^2}\upsilon_2\xi_2^T(\cdot)\xi_2(\cdot) + {}^C D_{0,t}^\alpha \alpha_2^c - s_2\upsilon_2^\gamma + u_{o2} \quad (51)$$

$${}^C D_{0,t}^\alpha \hat{\zeta}_2 = \upsilon_2^2 \xi_2^T(\cdot)\xi_2(\cdot)/2b_2^2 - \gamma_2\hat{\zeta}_2 \quad (52)$$

$${}^C D_{0,t}^\alpha \theta_2 = -k_2\theta_2 - \overline{\sigma}\eta_1\theta_1 - l_2\theta_2^\gamma \quad (53)$$

wherein $k_2 > 0$, $l_2 > 0$, $\gamma_2 > 0$ and $S_2 > 0$.

By inequation (14) and equations (51)-(53), inequation (50) is further simplified as:

$$\begin{aligned}{}^C D_{0,t}^\alpha V_2 &\leq -k_1\eta_1\upsilon_1^2 - k_2\upsilon_2^2 - k_1\eta_1\theta_1^2 - k_2\theta_2^2 + \overline{\sigma}\eta_1(\theta_1^2 + \Gamma_{2,1}^2)/2 + \\ &\sum_{i=1}^{2} b_i^2/2 + \sum_{i=1}^{2}\gamma_i\hat{\zeta}_i\tilde{\zeta}_i + \eta_1\upsilon_1^2\left(1/2 + \delta_1^2/2 - \left(\sqrt{1+k_1^2+\delta_1^2} - k_1\right)/\kappa_1^2\right) - \\ &\sum_{i=1}^{2} d_i|\theta_i|^{\gamma+1} - \sum_{i=1}^{2} b_i|\upsilon_i|^{\gamma+1} + \upsilon_2^2\left(\frac{1}{2} - \frac{\delta_2^2}{2} - \frac{1}{\kappa_2^2}\left(\sqrt{1+k_2^2+\delta_2^2} - k_2\right)\right)\end{aligned} \quad (54)$$

wherein $b_1 = s_2 - l_2\vartheta_2/(\gamma+1)$, and $d_2 = l_2(1 - \gamma\vartheta_2^{-1/\gamma}/(\gamma+1))$.

Step 3: also, a hierarchical type-2 fuzzy neural network with very high precision and repeatability is used for estimation to process the unknown nonlinear function $f_3$:

$$f_3 = w_3^T \xi_3(\cdot) + \varepsilon_3(\cdot) \quad (55)$$

The magnetic field orientation control is adopted, so that $\alpha_3^c$ is equal to zero. A last Lyapunov candidate function is defined as:

$$V_3 = V_2 + \frac{1}{2}\upsilon_3^2 + \frac{1}{2}\tilde{\zeta}_3^2 + \frac{1}{2}\theta_3^2 \quad (56)$$

The fractional-order derivative of $V_3$ is calculated as:

$$\begin{aligned}{}^C D_{0,t}^\alpha V_3 &\leq -k_1\eta_1\upsilon_1^2 - k_2\upsilon_2^2 - k_1\eta_1\theta_1^2 - k_2\theta_2^2 + \overline{\sigma}\eta_1(\theta_1^2 + \Gamma_{2,1}^2)/2 + \\ &\sum_{i=1}^{3} b_i^2/2 + \sum_{i=1}^{2}\gamma_i\hat{\zeta}_i\tilde{\zeta}_i - \sum_{i=1}^{2} d_i|\theta_i|^{\gamma+1} - \sum_{i=1}^{2} b_i|\upsilon_i|^{\gamma+1} + \theta_3 {}^C D_{0,t}^\alpha \theta_3 + \\ &\upsilon_3(\hat{\zeta}_3\upsilon_3\xi_3^T(\cdot)\xi_3(\cdot)/2b_3^2 + u_3 + \varepsilon_3) + \hat{\zeta}_3(\upsilon_3^2\xi_3^T(\cdot)\xi_3(\cdot)/2b_3^2 - {}^C D_{0,t}^\alpha \hat{\zeta}_3) + \\ &\eta_1\upsilon_1^2\left(1/2 + \delta_1^2/2 - \left(\sqrt{1+k_1^2+\delta_1^2} - k_1\right)/\kappa_1^2\right) - \\ &\upsilon_3 {}^C D_{0,t}^\alpha \theta_3 + \upsilon_2^2\left(1/2 + \delta_2^2/2 - \left(\sqrt{1+k_2^2+\delta_2^2} - k_2\right)/\kappa_2^2\right)\end{aligned} \quad (57)$$

wherein $\zeta_3 = \|w_3\|^2$, and $b_3 > 0$.

The d-axis control input, the adaptive law and the compensation signal are designed as follows:

$$u_3 = -k_3 z_3 - \hat{\zeta}_3\upsilon_3\xi_3^T(\cdot)\xi_3(\cdot)/2b_3^2 - s_3\upsilon_3^\gamma + u_{o3} \quad (58)$$

$${}^C D_{0,t}^\alpha \hat{\zeta}_3 = \upsilon_3^2 \xi_3^T(\cdot)\xi_3(\cdot)/2b_3^2 - \gamma_3\hat{\zeta}_3 \quad (59)$$

$${}^C D_{0,t}^\alpha \theta_3 = -k_3\theta_3 - l_3\theta_3^\gamma \quad (60)$$

wherein $k_3 > 0$, $l_3 > 0$, $\gamma_3 > 0$ and $s_3 > 0$.

The following can be obtained:

$$\begin{aligned}{}^C D_{0,t}^\alpha V_3 &\leq -k_1\eta_1\upsilon_1^2 - \sum_{i=2}^{3} k_i\upsilon_i^2 - k_1\eta_1\theta_1^2 - \sum_{i=2}^{3} k_i\theta_i^2 + \\ &\overline{\sigma}\eta_1(\theta_1^2 + \Gamma_{2,1}^2)/2 + \eta_1\upsilon_1^2\left(1/2 + \delta_1^2/2 - \left(\sqrt{1+k_1^2+\delta_1^2} - k_1\right)/\kappa_1^2\right) - \\ &\sum_{i=1}^{3} b_i|\upsilon_i|^{\gamma+1} + \sum_{i=2}^{3} \upsilon_i^2\left(\frac{1}{2} + \frac{\delta_i^2}{2} - \frac{1}{\kappa_i^2}\left(\sqrt{1+k_i^2+\delta_i^2} - k_i\right)\right) + \\ &\sum_{i=1}^{3} b_i^2/2 + \sum_{i=1}^{3}\gamma_i\hat{\zeta}_i\tilde{\zeta}_i - \sum_{i=1}^{3} d_i|\theta_i|^{\gamma+1},\end{aligned} \quad (61)$$

wherein $b_3 = s_3 - l_3\vartheta_3/(\gamma+1)$, and $d_3 = l_3(1 - \gamma\vartheta_3^{-1/\gamma}/(\gamma+1))$.

Note 3: when the order of a complex nonlinear system increases, the filtering error of the fractional-order finite-time command filter becomes difficult to control. In this case, it is difficult to obtain a minimum tracking error. Therefore, it is necessary and meaningful to solve this problem and achieve finite-time convergence by constructing compensation signals.

4. Stability Analysis

Principle 1: for the problem of fuzzy finite-time optimal synchronous control of the unidirectional coupling fractional-order permanent magnet synchronous generator with chaotic oscillation, if q-axis control input (51) and d-axis control input (58) with adaptive laws (52), (59) and compensation signals (53), (60) are designed, all signals of a closed-loop system are bounded, and synchronization errors meet a prescribed performance requirement. Meanwhile, the purpose of fuzzy finite-time optimal synchronous control is achieved, and the cost function is minimized.

Proof: the whole Lyapunov-candidate-function is defined as:

$$V_e = \frac{1}{2}\sum_{i=1}^{3}\upsilon_i^2 + \frac{1}{2}\sum_{i=1}^{3}\tilde{\zeta}_i^2 + \frac{1}{2}\sum_{i=1}^{3}\theta_i^2 \quad (62)$$

The fractional-order derivative of equation (62) is obtained:

$$\begin{aligned}{}^C D_{0,t}^\alpha V_e &\leq -k_1\eta_1\upsilon_1^2 - \sum_{i=2}^{3} k_i\upsilon_i^2 - \eta_1(k_1 - \overline{\sigma}/2)\theta_1^2 - \sum_{i=2}^{3} k_i\theta_i^2 + \\ &\overline{\sigma}\eta_1\Gamma_{2,1}^2/2 + \eta_1\upsilon_1^2\left(1/2 + \delta_1^2/2 - \left(\sqrt{1+k_1^2+\delta_1^2} - k_1\right)/\kappa_1^2\right) + \sum_{i=1}^{3} b_i^2/2 - \\ &\sum_{i=1}^{3} d_i|\theta_i|^{\gamma+1} + \sum_{i=2}^{3} \upsilon_i^2\left(1/2 + \delta_i^2/2 - \left(\sqrt{1+k_i^2+\delta_i^2} - k_i\right)/\kappa_i^2\right) - \\ &\sum_{i=1}^{3} b_i|\upsilon_i|^{\gamma+1} + \sum_{i=1}^{3}\gamma_i\tilde{\zeta}_i^2/2 - \sum_{i=1}^{3}\gamma_i\tilde{\zeta}_i^2/2 \leq -a_e V_e - b_e V_e^{(\gamma+1)/2} + c_e,\end{aligned} \quad (63)$$

wherein $$a_e = 2\min\left\{\frac{\eta_1(k_1 - \bar{\sigma}/2), \eta_1(k_1 - \psi_1), k_2 + \psi_2, k_3 + \psi_3,}{\gamma_1/2, \gamma_2/2, \gamma_3/2}\right\},$$

$$b_e = 2\min\{d_1, b_1, d_2, b_2, d_3, b_3\},$$

$$c_e = \bar{\sigma}\eta_1\Gamma_{2,1}^2/2 + \sum_{i=1}^{3}\gamma_i\zeta_i^2/2,$$

$$\psi_1 = \eta_1\left(1/2 + \delta_1^2/2 - \left(\sqrt{1+k_1^2+\delta_1^2} - k_1\right)/\kappa_1^2\right),$$

$$\psi_2 = v_2^2\left(1/2 + \delta_2^2/2 - \left(\sqrt{1+k_2^2+\delta_2^2} - k_2\right)/\kappa_2^2\right),$$

$$\psi_3 = v_3^2\left(1/2 + \delta_3^2/2 -, \text{and} \left(\sqrt{1+k_3^2+\delta_3^2} - k_3\right)/\kappa_3^2\right).$$

The stability of $v_i$, $\zeta_i$ and $\theta_i$ are realized within the compact set $\Omega_e$ in the finite-time $T_0$, i.e., $$\Omega_e := \{v_i \in \mathbb{R}, \theta_i \in \mathbb{R}, \zeta_i \in \mathbb{R}, i=1,2,3 | v_i^2 + \zeta_i^2 + \theta_i^2 \leq D_e\} \quad (64)$$

wherein $D_e = \min\{c_e/(1-\lambda_e)a_e, (c_e/(1-\lambda_e)b_e)^{2/(\gamma+1)}\}$, and $0 < \lambda_e < 1$.

The finite-time $T_0$ is:

$$T_0 \leq \max\{t_1, t_2\} \quad (65)$$

wherein $t_1 = \ln((\lambda_e a_e V_e^{1-(1+\lambda_e)/2}(0) + b_e)/\lambda_e a_e(1-(1+\lambda_e)/2)$, and $t_2 = \ln((a_e V_e^{1-(1+\lambda_e)/2}(0) + \lambda_e b_e)/\lambda_e b_e)/a_e(1-(1+\lambda_e)/2)$.

The proof is finished.

5. Results and Analysis

A numerical method for solving the nonlinear fractional-order system based on an integral rule is constructed and realized by programming. The coupling parameters of the driving and driven permanent magnet synchronous generators are $\kappa_1=0.1$ and $\kappa_2=-0.1$. The parameters of the finite-time prescribed performance function are selected as follows: $a_0=0.4$, $a_1=0$, $a_2=-4.9$, $a_3=6.3$, and $\beta_{T_0}=0.02$. The finite-time is set as $T_0=0.4$, and the parameters of the fractional-order finite-time commands filter are set as $c_{1,1}=6$ and $c_{1,2}=5$. The parameters of a smooth reversible function are set as $\underline{\rho}=0.1$ and $\bar{\rho}=1$. The parameters of the controller are set as $k_1=k_2=k_3=10$, $\gamma_1=\gamma_2=2$, $\gamma_3=8$, $l_1=l_2=l_3=10$, $s_1=s_2=s_3=0.5$, $\delta_1^2=\delta_2^2=\delta_3^2=2$, $\gamma=0.4$ and $k_1=k_2=k_3=1$. The centers of the membership grade associated with the hierarchical type-2 fuzzy neural network are evenly distributed on the interval [−1 1], and the upper width and the lower width of the membership grade are selected as $\bar{\sigma}_{A_j^i}=0.06$ and $\underline{\sigma}_{A_j^i}=0.02$.

Figure 6:
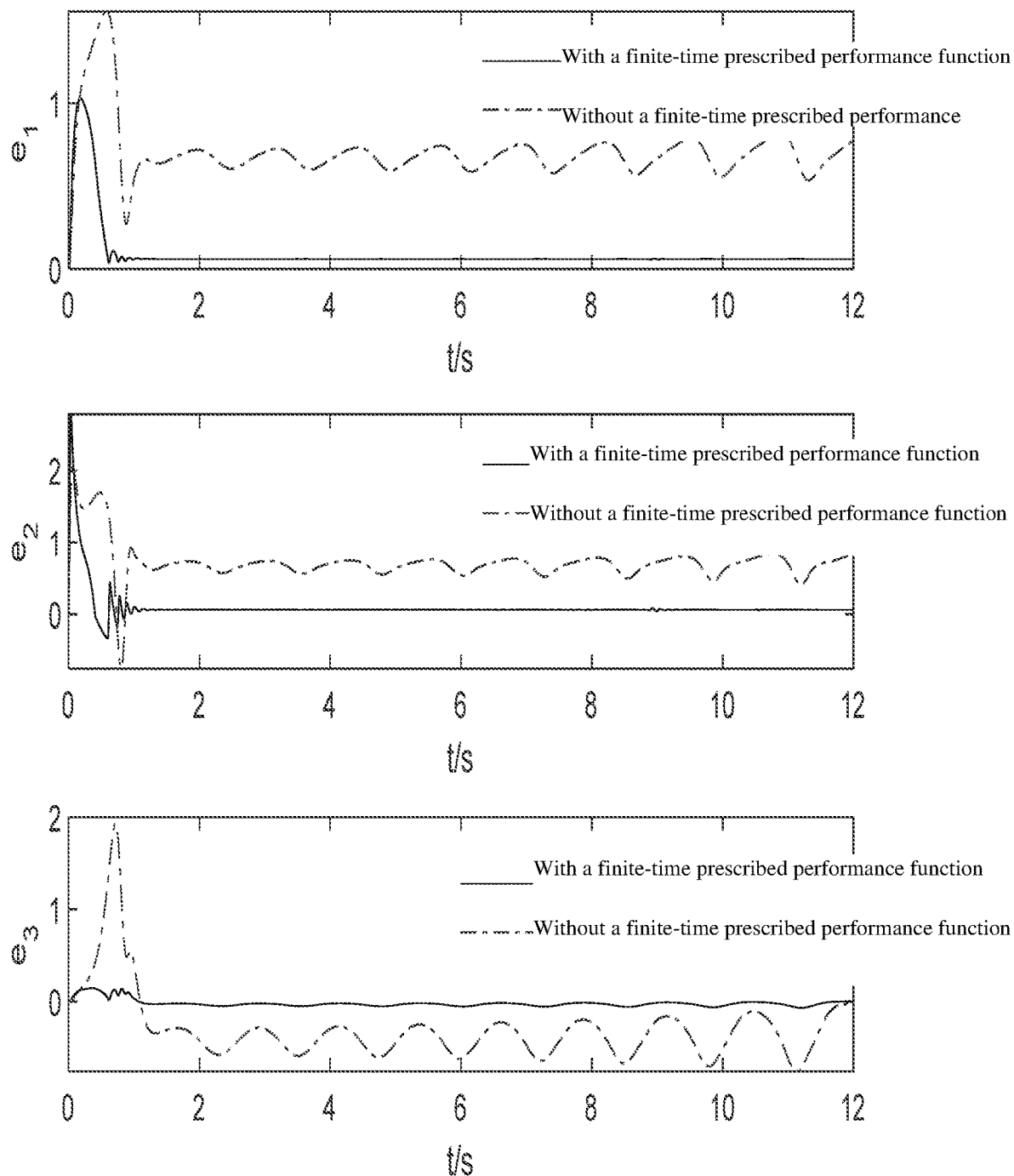
FIG. 6 is diagrams of synchronization errors with/without a finite-time prescribed performance function under the same conditions.

FIG. 6 is diagrams of synchronization errors of the driving and driven unidirectional coupling fractional-order permanent magnet synchronous generators with and without a finite-time prescribed performance function. It is clear that the conventional scheme without a finite-time prescribed performance function has a large overshoot and a long oscillation period throughout the operation. The designed scheme realizes the rapid synchronization of the driving and driven permanent magnet synchronous generators, and realizes very small errors in the finite-time. Therefore, the designed scheme is significantly better than the conventional scheme without the finite-time prescribed performance function under the same conditions.

Figure 7:
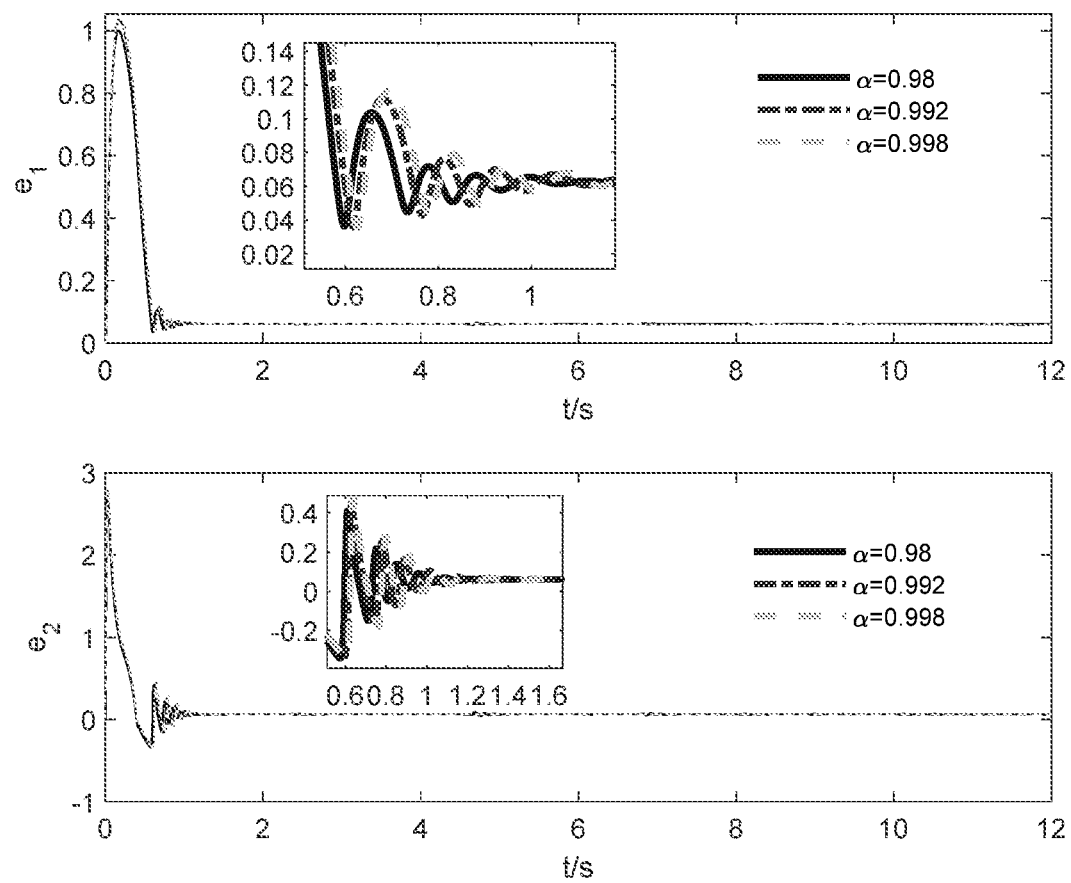
FIG. 7 is diagrams of synchronization errors at different fractional-orders.

Real-time changes in the grid caused by the ambient environment through the transmission buses and feeders of the wind farm can have an unavoidable effect on the working conditions of each generator, which can lead to inaccurate modeling and system parameter perturbations. As can be seen from FIG. 7, the designed scheme better overcomes these adverse effects, and the AC driving and driven permanent magnet synchronous generators achieve accurate frequency coincidence under normal load. The motion state of the driven permanent magnet synchronous generator is attracted into the attractor of the driving permanent magnet synchronous generator in the shortest time possible. At the same time, the synchronization error is controlled within a pre-configured performance range.

Figure 8:
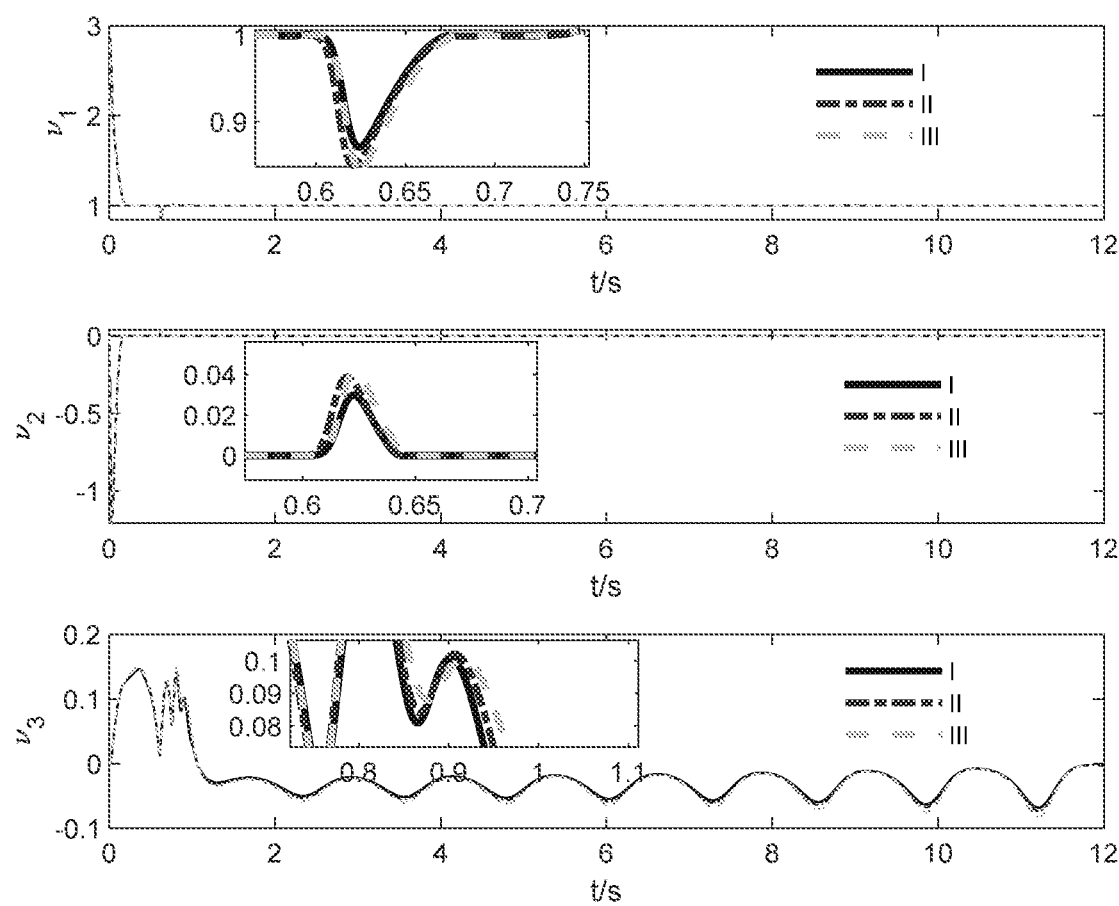
FIG. 8 is diagrams of compensated tracking errors for different coupling parameters.

The size of the coupling coefficient directly determines synchronous/asynchronous motion and harmonic oscillation/periodic motion when the permanent magnet synchronous generator operates in parallel. Three combinations are given, such as, I: $\kappa_1=0.1$, and $\kappa_2=-0.1$; II: $\kappa_1=0.2$, and $\kappa_2=-0.15$; III: $\kappa_1=0.15$, and $\kappa_2=-0.2$. Under all three working conditions, the permanent magnet synchronous generator will generate an oscillation behavior before the proposed method is applied. FIG. 8 shows the compensated tracking errors after the designed scheme is adopted, and it is clear that several curves have been overlapping. It is indicated that the designed method has stronger coupling coefficient perturbation resistance.

Figure 9:
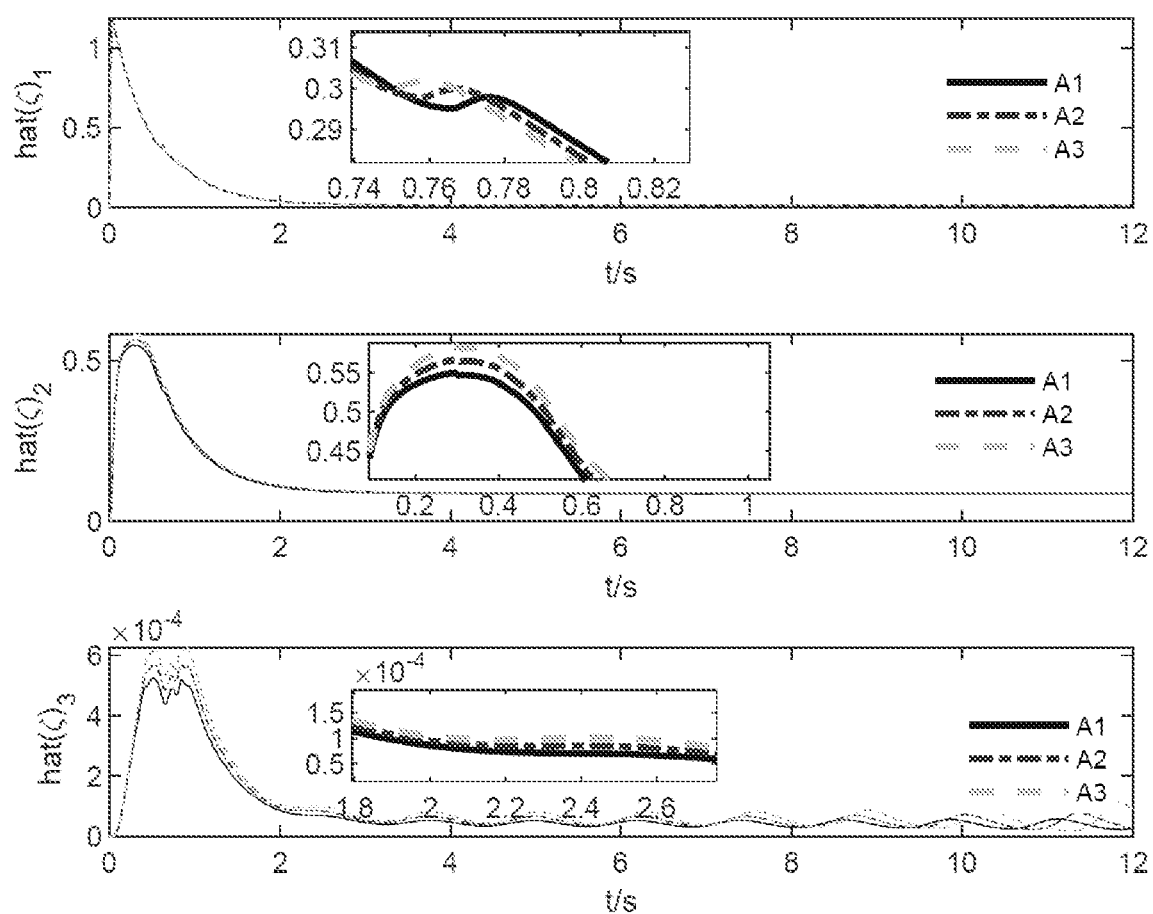
FIG. 9 is diagrams of transition weights for different system parameters.
Figure 10:
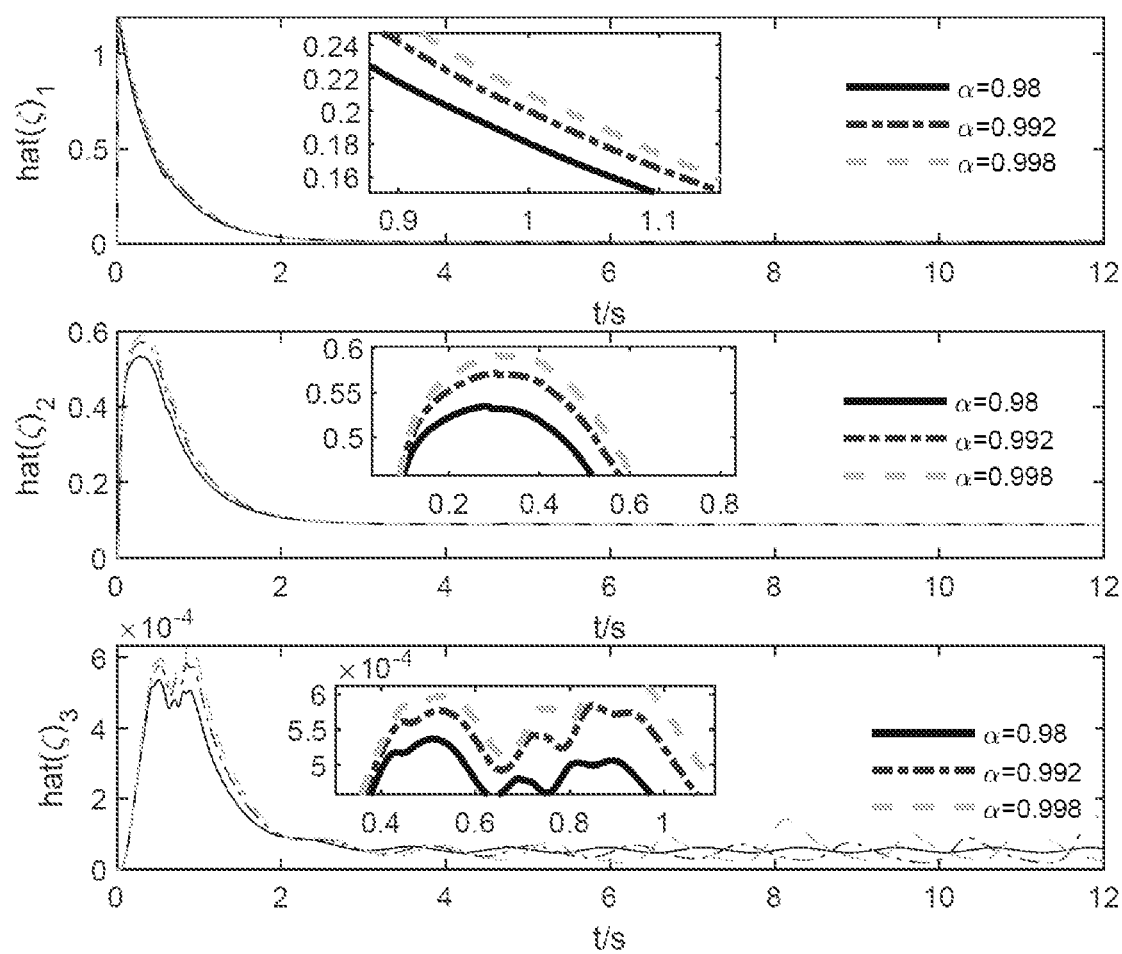
FIG. 10 is diagrams of transition weights at different fractional-orders.

The hierarchical type-2 fuzzy neural network with conversion performs compensation and function approximation on the flutter caused by wind speeds, generator temperatures, stator resistance, friction coefficient, workload, and the like. Three sets of system perturbation parameters are defined: A1: $\rho=5$, and $\mu=19$; A2: $\rho=5.5$, and $\mu=20$; A3: $\rho=6$, and $\mu=21$. It can be seen from FIGS. 9-10 that the conversion weights of the hierarchical type-2 fuzzy neural network can be converged into a small neighborhood of the origin rapidly in the self-structure algorithm. At the same time, the three curves always overlap whether in different system parameters or in different fractional-orders.

Figure 11:
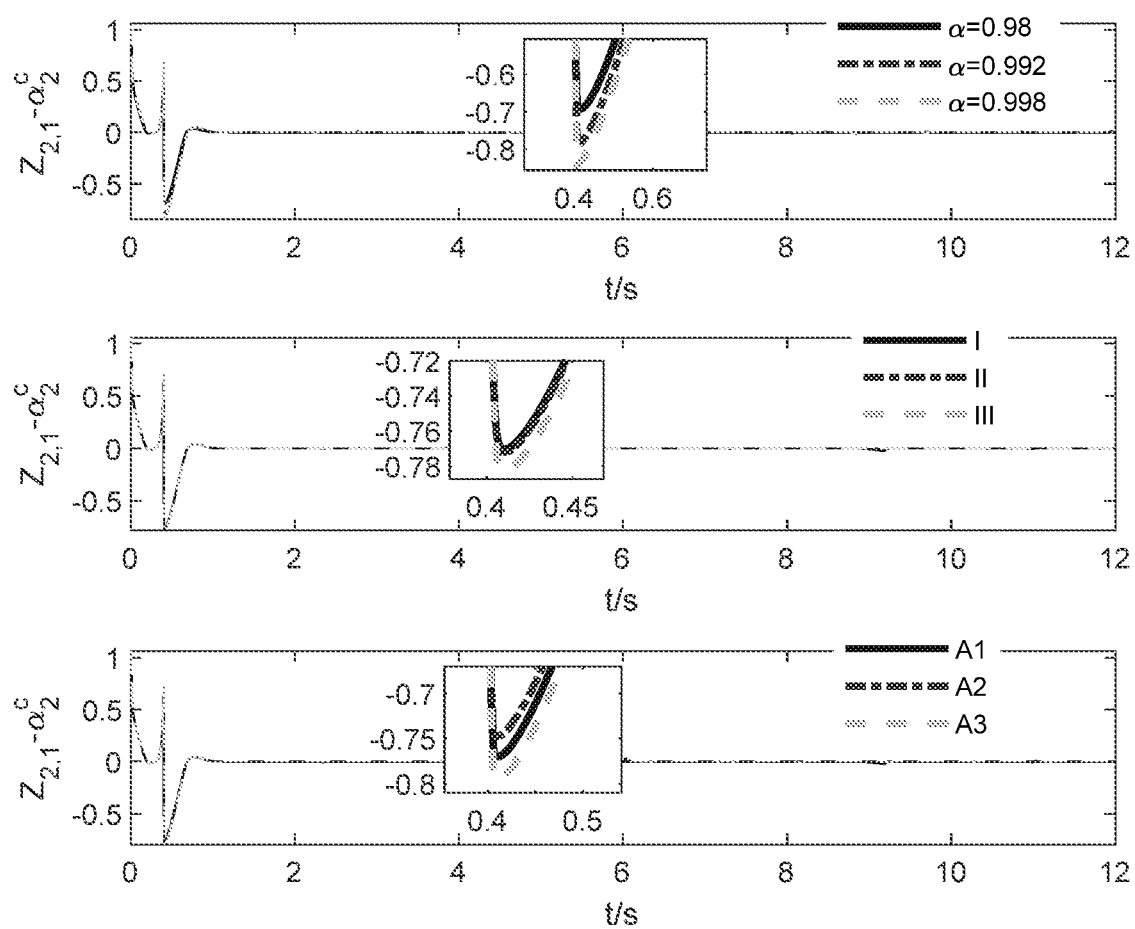
FIG. 11 is diagrams of performance of a fractional-order finite-time command filter under different working conditions.

The fractional-order finite-time command filter matched with the compensation signal achieves the purposes of high response speed, high estimation precision and finite-time convergence. FIG. 11 fully shows that the fractional-order finite-time instruction filter maintains its high performance regardless of the presence of variable coupling coefficients, system parameter perturbations or fractional-order variations, and the like.

Figure 12:
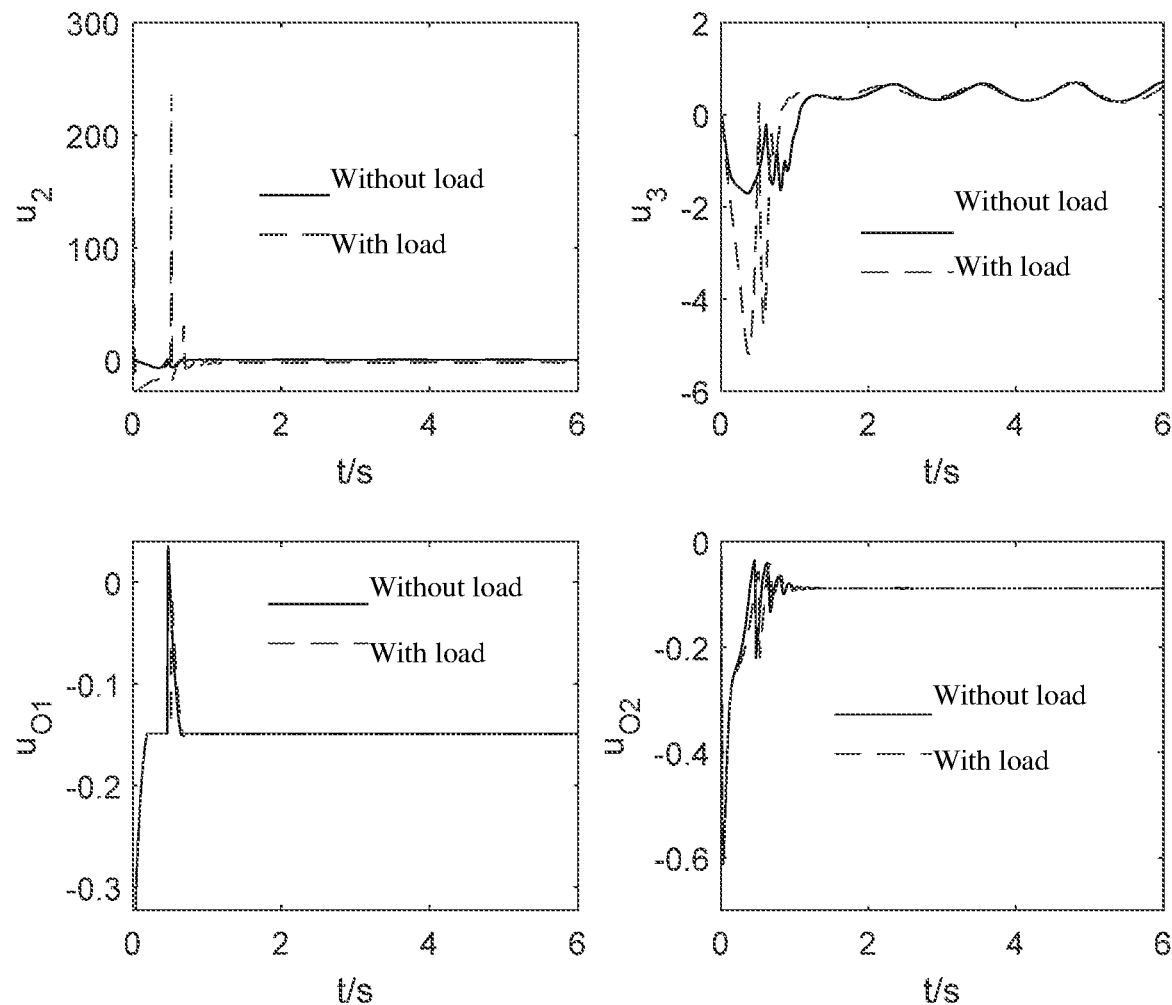
FIG. 12 is diagrams of q-axis and d-axis control inputs and optimal control inputs with or without generator load at the start.

FIG. 12 is control inputs and optimal control inputs with and without an external load at the start. It can be seen from FIG. 12 that the unidirectional coupling fractional-order permanent magnet synchronous generator system rapidly realizes stable operation after transient fluctuation when loaded. Therefore, the designed controller has good anti-interference capability.

Figure 13:
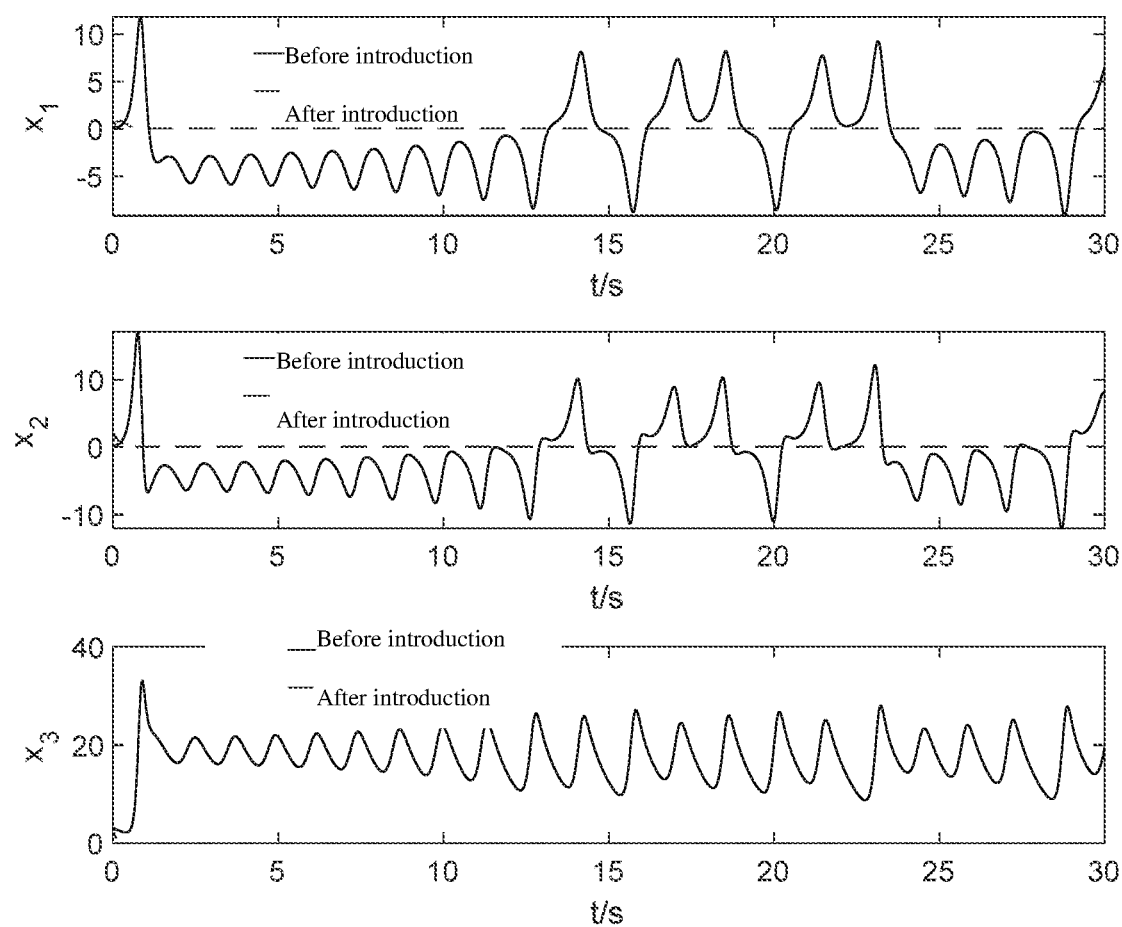
FIG. 13 is diagrams of chaos suppression capability.

As can be seen from FIG. 13, when the proposed control method is not yet introduced, the permanent magnet synchronous generator may generate a large number of dynamic behaviors including chaotic oscillation. Once the proposed fuzzy finite-time optimal control scheme is used, each permanent magnet synchronous generator switches to periodic motion immediately within 0.4 seconds, where the corresponding chaotic oscillations are completely suppressed.

Finally, the above embodiments are only used to illustrate the technical scheme of the present invention without limitation. Although the present invention has been described in detail with reference to the preferred embodiments, it should be understood by those skilled in the art that modifications or equivalent substitutions of the technical scheme of the present invention may be made within the scope of the appended claims herein without departing from the spirit and scope of the technical scheme.

What is claimed is:

1. A fuzzy finite-time optimal synchronization control method for a fractional-order permanent magnet synchronous generator, comprising the following steps:

S1: modeling a system;

wherein a wind energy conversion system consists of a wind turbine, a permanent magnet synchronous generator and three converters, and the three converters are sequentially a diode bridge rectifier, a DC/DC boost converter and an inverter in the order; the electric energy generated by the permanent magnet synchronous generator is transmitted to a grid through the converters;

in combination with local aerodynamic characteristics, the power generated by the wind turbine is expressed as:

$$P_w = \frac{1}{2}\rho \pi C_p(\omega_r R/v_w, \beta)R^2 v_w^3 \tag{1}$$

wherein $\rho$, R, $\omega_r$, $\beta$, $\omega_r$ and $v_w$ represent air density, turbine radius, rotation speed, propeller blade angle, rotation speed and wind speed, respectively, and $C_p(\omega_r R/v_w, \beta)$ represents turbine power coefficient;

a mechanical fractional-order model of the permanent magnet synchronous generator is provided according to rotation law:

$$J\frac{d^\alpha \omega_r}{dt^\alpha} = T_s - b\omega_r - T_t \tag{2}$$

wherein $\alpha$, J, $T_t$, $T_g$, $\tilde{t}$ and b represent fractional-order coefficient, system inertia, turbine torque, generator torque, time and viscous friction coefficient, respectively;

the torque of an electromagnetic generator is expressed as:

$$T_g = \frac{3}{2}p((L_q - L_d)i_d i_q + i_q \phi) \tag{3}$$

wherein $L_d$ and $L_q$ represent d-axis inductance and q-axis inductance, respectively, $i_d$ and $i_q$ represent d-axis stator current and q-axis stator current, respectively, p and $\phi$ represent the number of pole pairs and magnetic flux of permanent magnets in a three-phase permanent magnet synchronous generator, respectively;

the fractional-order model of the permanent magnet synchronous generator in a synchronous rotating d-q reference frame is expressed as:

$$\begin{cases} \frac{d^\alpha i_d}{dt^\alpha} = (-R_s i_d + \omega_r L_q i_q + V_d)/L_d \\ \frac{d^\alpha i_q}{dt^\alpha} = (-R_s i_q - (L_d i_d + \phi)\omega_r + V_q)/L_q \end{cases} \tag{4}$$

wherein $R_s$, $V_d$ and $V_q$ represent stator resistance, d-axis stator voltage and q-axis stator current, respectively;

in the Laplace domain, a fractional-order integrator in the form of linear approximation with a zero pole pair is represented by a transfer function with a slope of −20m dB/decade in a Bode diagram:

$$F(s) = \frac{1}{s^\alpha} \approx \prod_{i=0}^{N_f - 1}(1 + s/Q_i) \Big/ \prod_{i=0}^{N_f - 1}(1 + s/P_i) \tag{5}$$

wherein $$N_f = \text{integer}\left(\frac{\log(\omega_{max}/p_f)}{\log\left(10^{d_f/10(1-\alpha)} \cdot 10^{d_f/10\alpha}\right)}\right) + 1,$$

and $P_f$, $\omega_{max}$ and $d_f$ represent difference values between angular frequency, bandwidth and actual line and approximate line, respectively; $Q_i$ and $P_i$ represent zero and pole of singularity function, respectively;

$L = L_d = L_q$ is obtained due to symmetrical stator windings;

a fractional-order model of the permanent magnet synchronous generator is defined by equation (2) and equation (4) as follows:

$$\begin{cases} {}^C\mathcal{D}_{0,t}^\alpha \omega_r = (3p\phi i_q/2 - b\omega_r - T_t)/J, \\ {}^C\mathcal{D}_{0,t}^\alpha i_q = (-R_s i_q - (Li_d + \phi)\omega_r + V_q)/L, \\ {}^C\mathcal{D}_{0,t}^\alpha i_d = (-R_s i_d + \omega_r L i_q + V_d)/L, \end{cases} \tag{6}$$

wherein ${}^C\mathcal{D}_{0,t}^\alpha$ represents Caputo fractional-order derivative with $\alpha > 0$ and starting point at origin;

by introducing new variables $x_1 = L\omega_r/R_s$, $x_2 = pL\phi i_q/bR_s$ and $x_3 = pL\phi i_d/bR_s$, a normalized fractional-order model of a permanent magnet synchronous main motor is expressed as:

$$\begin{cases} {}^C\mathcal{D}_{0,t}^\alpha x_1 = \sigma x_2 - \rho x_1 + T_L \\ {}^C\mathcal{D}_{0,t}^\alpha x_2 = -x_2 - x_1 x_3 + \mu x_1 + u_q \\ {}^C\mathcal{D}_{0,t}^\alpha x_3 = -x_3 + x_1 x_2 + u_d \end{cases} \tag{7}$$

wherein $t = \tilde{t}R_s/L$, $u_q = pL\phi V_q/bR_s^2$, $u_d = pL\phi V_d/bR_s^2$, $T_L = -L^2 T_t/JR_s^2$, $\mu = -p\phi^2/bR_s$, $\sigma = 3Lb/2JR_s$, and $\rho = bL/JR_s$, and $x_1$, $x_2$, $x_3$, t, $u_q$, $u_d$ and $T_L$ represent normalized angular velocity, q-axis current, d-axis current, time, q-axis voltage, d-axis voltage and load torque, respectively; $\sigma$, $\rho$ and $\mu$ represent system parameters;

a fractional-order model of the driven permanent magnet synchronous generator is established by using a Heaviside function $H(t - T_g)$:

$$\begin{cases} {}^C\mathcal{D}_{0,t}^\alpha y_1 = \sigma y_2 - \rho y_1 + T_L \\ {}^C\mathcal{D}_{0,t}^\alpha y_2 = -y_2 - y_1 y_3 + \mu y_1 - (\kappa_1(y_1 - x_1) + \kappa_2(y_2 - x_2)) \cdot \\ H(t - t_g) + u_q + u_2 \\ {}^C\mathcal{D}_{0,t}^\alpha y_3 = -y_3 + y_1 y_2 + u_d + u_3 \end{cases} \tag{8}$$

wherein $t_g$, $\kappa_1$ and $\kappa_2$ represent primary synchronous time, the capacitance coupling and the resistance coupling, respectively, and $u_2$ and $u_3$ represent control inputs;

synchronization errors are defined as $e_1 = y_1 - x_1$, $e_2 = y_2 - x_2$ and $e_3 = y_3 - x_3$; the following equation is obtained by subtracting equation (7) from equation (8):

$$\begin{cases} {}^C\mathcal{D}^\alpha_{0,t}e_1 = \sigma e_2 - \rho e_1, \\ {}^C\mathcal{D}^\alpha_{0,t}e_2 = -e_2 - y_1y_3 + x_1x_3 + \mu e_1 - (\kappa_1 e_1 + \kappa_2 e_2)H(t-t_g) + u_2, \\ {}^C\mathcal{D}^\alpha_{0,t}e_3 = -e_3 + y_1y_2 - x_1x_2 + u_3. \end{cases} \quad (9)$$

definition 1: for a sufficiently differentiable function F(t), the Caputo fractional-order derivative is expressed as:

$${}^C\mathcal{D}^\alpha_{0,t}(t) = \frac{1}{\Gamma(n-\alpha)} \int_0^t \frac{F^{(n)}(\tau)}{(t-\tau)^{1-n+\alpha}} d\tau \quad (10)$$

wherein $$\Gamma(n-\alpha) = \int_0^\infty e^{-t} t^{n-\alpha-1} dt$$

represents Euler gamma function, n−1<α<n, and n∈ $\mathbb{N}_+$;
a Laplace transform is performed on equation (10) to obtain:

$$L\{{}^C\mathcal{D}^\alpha_{0,t}F(t)\} = s^\alpha L\{F(t)\} - \sum_{k=0}^{n-1} \frac{F^{(k)}(0)}{s^{k+1-\alpha}} \quad (11)$$

for any continuous function, when 0<α<1 and $F_1(t)$ and $F_2(t)$ are within an interval $[0,t_\zeta]$, the following equation is obtained:

$$F_1(t) \cdot {}^C\mathcal{D}^\alpha_{0,t}F_2(t) + F_2(t) \cdot {}^C\mathcal{D}^\alpha_{0,t}F_1(t) = {}^C\mathcal{D}^\alpha_{0,t}(F_1(t) \cdot F_2(t)) + \frac{\alpha}{\Gamma(1-\alpha)} \int_0^t \frac{1}{(t-\varsigma)^{1-\alpha}} \left( \int_0^\varsigma \frac{F'_1(\varsigma_1)d\varsigma_1}{(t-\varsigma_1)^\alpha} \cdot \int_0^\varsigma \frac{F'_2(\varsigma_2)d\varsigma_2}{(t-\varsigma_2)^\alpha} \right) d\varsigma \quad (12)$$

when $F_1(t)=F_2(t)$, the following inequation is derived as:

$${}^C\mathcal{D}^\alpha_{0,t}(F^2(t)) \leq 2F(t) \cdot {}^C\mathcal{D}^\alpha_{0,t}F(t) \quad (13)$$

lamma 1: for any $x_s, y_s \in \mathbb{R}$, $\vartheta(x_s, y_s)$ is any positive real function and then the following inequation holds if $c_s > 0$ and $d_s > 0$;

$$|x_s|^{c_s}|y_s|^{d_s} \leq \frac{c_s \vartheta(x_s, y_s)|x_s|^{c_s+d_s}}{c_s+d_s} + \frac{d_s \vartheta(x_s, y_s)^{\frac{c_s}{d_s}}|y_s|^{c_s+d_s}}{c_s+d_s} \quad (14)$$

definition 2: a minimum performance cost function is as follows:

$$\bar{J} = \int_0^\infty \left( \bar{Q}(\bar{S}(t)) + U^T \bar{R} U \right) dt \quad (15)$$

wherein $\bar{S}$, U and $\bar{R}$ represent a penalty function, an optimal control input and an N-order matrix, respectively, and $\bar{Q}(\bar{S}) > 0$;

S2: designing a numerical method, applying the numerical method to solve a nonlinear fractional-order system, establishing a fractional-order differential solver comprising a fractional-order value, a system dimension, a start-stop time, a time span, a system initial value, a Gram-Schmidt step size, multilayer correction iteration and convergence error, outputting data, storing the data in a double precision matrix format, and setting the unlimited number of warning information and the minimum step size of machine precision; and S3: establishing a hierarchical type-2 fuzzy neural network and designing a controller that provides an ordered and coordinated motion for the fractional-order permanent magnet synchronous generator.

2. The fuzzy finite-time optimal synchronization control method for a fractional-order permanent magnet synchronous generator according to claim 1, wherein the S2 specifically comprises the following:

for a fractional-order differential equation ${}^C\mathcal{D}^\alpha_{0,t} y_f(t) = g(t, y_f(t))$, t≥0 with a given function g(•,•), the fractional-order derivative quotient of $y_f(t)$ is defined as an infinite series, i.e., $${}^C\mathcal{D}^\alpha_{0,t} y_f(t) = \lim_{h \to 0} \frac{1}{h^\alpha} \sum_{j=0}^{\lfloor t/h \rfloor} \omega_j^{(\alpha)} (y_f(t-jh) - y_f(0)), \quad \omega_j^{(\alpha)} = (-1)^j \binom{\alpha}{j} \quad (16)$$

wherein h>0 and $\omega_j^{(\alpha)}$ represent step size and coefficient, respectively, and a condition based on the Euler-Gamma function is satisfied as follows:

$$\binom{\alpha}{j} = \begin{cases} \Gamma(\alpha+1)/\Gamma(\alpha+1-j)j! & j=0,\ldots,\alpha \\ 0 & j>\alpha \end{cases} \quad (17)$$

an equidistant grid $t_n=nh$, n=0, 1, •••, N is defined in an interval [0 T], wherein N=T/h; an integral expression is then obtained when $t=t_n$:

$$y_f(t_n) = y_{f_0} + \frac{1}{\Gamma(\alpha)} \sum_{j=0}^{n-1} \int_{t_j}^{t_{j+1}} (t_n - \tau)^{\alpha-1} g(\tau, y_f(\tau)) d\tau \quad (18)$$

a vector field $g(\tau, y_f(\tau))$ is approximated by a constant $g(t_j, y_{f_j})$ over each subinterval $[t_j, t_{j+1}]$; a numerical value of equation (18) is rewritten as:

$$y_f(t_n) = y_{f_0} + h^\alpha \sum_{j=0}^{n-1} \frac{((n-j)^\alpha - (n-j-1)^\alpha)}{\Gamma(\alpha+1)} g(t_j, y_{f_j}) \quad (19)$$

system parameters of the fractional-order model of the driving/driven permanent magnet synchronous generator are set to be three working conditions:
working condition 1: α=0.99, σ=3, ρ=4, μ=25, $T_L$=0, and the initial conditions are $x_1(0)$=0.1, $x_2(0)$=0.9, and $x_3(0)$=20;
working condition 2: α=0.99, σ=17, ρ=16, μ=25, $T_L$=0, and the initial conditions are $x_1(0)$=1.5, $x_2(0)$=0.5, and $x_3(0)$=20; and
working condition 3: α=0.99, σ=5.5, ρ=5.5, μ=20, $T_L$=0, and the initial conditions are $x_1(0)$=0.1, $x_2(0)$=0.1, and $x_3(0)$=3;
approximate transfer functions of different fractional-orders are given by introducing equation (5):

$$\frac{1}{s^{0.998}} = \frac{9.95405(1+9.65984 \times 10^{-10}s)(1+9.8853 \times 10^{-5}s)}{(1+9.43952 \times 10^{-10}s)(1+9.65984 \times 10^{-5}s)(1+9.8853s)} \quad (20)$$

-continued $$\frac{1}{s^{0.992}} = \frac{9.81748(1+9.32735\times 10^{-5}s)(1+0.0308972s)}{(1+8.90424\times 10^{-5}s)(1+0.0294957s)(1+9.77056s)} \quad (21)$$

$$\frac{1}{s^{0.98}} = \frac{(9.54993(1+7.90604\times 10^{-6}s)(1+0.000868511s)(1+0.0954095s))}{((1+7.19686\times 10^{-6}s)(1+0.000790604s)(1+0.0868511s)(1+9.54s))} \quad (22)$$

error values in the above equations are ≤0.1 dB, ≤0.2 dB and ≤0.4 dB, respectively.

3. The fuzzy finite-time optimal synchronization control method for the fractional-order permanent magnet synchronous generator according to claim 1, wherein the S3 specifically comprises the following:

the hierarchical type-2 fuzzy neural network consists of an input layer, a membership layer, a rule layer, a type-reduction layer and an output layer;

at the second level, upper and lower membership levels are written as:

$$\overline{\mu}_{A_i^j}(x_i) = \exp(-((x_i - m_{A_i^j})/\overline{\sigma}_{A_i^j})^2/2),$$
$$\underline{\mu}_{A_i^j}(x_i) = \exp(-((x_i - m_{A_i^j})/\underline{\sigma}_{A_i^j})^2/2), i=1,\cdots,N \quad (23)$$

wherein $m_{A_i^j}$, $\overline{\sigma}_{A_i^j}$ and $\underline{\sigma}_{A_i^j}$ represent a center, an upper width and a lower width of the $j^{th}$ membership level of the $i^{th}$ input, respectively;

in the rule layer, an upper/down trigger rule is calculated as:

$$\overline{T}_{ac}^j = \overline{\mu}_{A_1}^a(x_1)\overline{\mu}_{A_2}^c(x_2),\ \underline{T}_{ac}^j = \underline{\mu}_{A_1}^a(x_1)\underline{\mu}_{A_2}^c(x_2) \quad (24)$$

in the fourth layer, $Y_R$ and $Y_L$ are expressed in the form of a set type-reduction center as:

$$Y_R = \frac{\sum_{j=1}^{M} R^j \underline{T}^j w_R^j + \sum_{j=r+1}^{M} (1-R^j)\overline{T}^j w_R^j}{\sum_{j=1}^{M} R^j \underline{T}^j + \sum_{j=r+1}^{M} (1-R^j)\overline{T}^j}, \quad (25)$$

$$Y_L = \frac{\sum_{j=1}^{M} L^j \overline{T}^j w_L^j + \sum_{j=l+1}^{M} (1-L^j)\underline{T}^j w_L^j}{\sum_{j=1}^{M} L^j \overline{T}^j + \sum_{j=l+1}^{M} (1-L^j)\underline{T}^j} \quad (45)$$

wherein $W_R^j$ and $W_L^j$ are referred as weight, $\underline{T}^j$ and $\overline{T}^j$ represent upper and lower trigger degrees of the $j^{th}$ rule, M represents the number of fuzzy rules, $$R \equiv \begin{bmatrix} 1 & \cdots & 1 & 0 & \cdots & 0 \\ \downarrow & \cdots & \downarrow & \downarrow & \cdots & \downarrow \\ 1 & \cdots & r & r+1 & \cdots & M \end{bmatrix} \in \mathbb{R}^M,$$

and $$L \equiv \begin{bmatrix} 1 & \cdots & 1 & 0 & \cdots & 0 \\ \downarrow & \cdots & \downarrow & \downarrow & \cdots & \downarrow \\ 1 & \cdots & l & l+1 & \cdots & M \end{bmatrix} \in \mathbb{R}^M;$$

in the output layer, the fuzzy output in the form of vector is derived as:

$$Y = w^T \xi = w_R^T \xi_R + w_L^T \xi_L \quad (26)$$

wherein $$w \equiv [w_R w_L],\ w_R \equiv \frac{1}{2}[w_R^1 \ \cdots \ w_R^M]^T,\ w_L \equiv \frac{1}{2}[w_L^1 \ \cdots \ w_L^M]^T,$$

$$\xi_R \equiv \begin{bmatrix} \dfrac{R^1 \underline{T}^1 + (1-R^1)\overline{T}^1}{\sum_{j=1}^{M} R^j \underline{T}^j + \sum_{j=r+1}^{M} (1-R^j)\overline{T}^j} & \cdots & \dfrac{R^M \underline{T}^M + (1-R^M)\overline{T}^M}{\sum_{j=1}^{M} R^j \underline{T}^j + \sum_{j=r+1}^{M} (1-R^j)\overline{T}^j} \end{bmatrix}^T,$$

$$\xi_L \equiv \begin{bmatrix} \dfrac{L^1 \underline{T}^1 + (1-L^1)\overline{T}^1}{\sum_{j=1}^{M} L^j \underline{T}^j + \sum_{j=r+1}^{M} (1-L^j)\overline{T}^j} & \cdots & \dfrac{L^M \underline{T}^M + (1-L^M)\overline{T}^M}{\sum_{j=1}^{M} L^j \underline{T}^j + \sum_{j=r+1}^{M} (1-L^j)\overline{T}^j} \end{bmatrix}^T,$$

and $\xi \equiv [\xi_R\ \xi_L]$ by calling equation (26), the hierarchical type-2 fuzzy neural network realizes high-precision approximation to any unknown but bounded function on a compact set, then $$\sup_{X\in D_X} |h(x) - w^T \xi(X)| \le \varepsilon(X) \quad (27)$$

wherein $X \equiv [x_1\ \cdots\ x_i]^T \in \mathbb{R}^i$, $i=1\cdots N$, N represents the number of inputs, $\varepsilon(X)>0$ represents approximation errors, and $\Omega_w$ and $D_X$ are compact sets of appropriate bounds of w and X, respectively; an optimal parameter w* is introduced, and the parameter meets the condition:

$$\arg\min_{w\in\Omega_w}\left[\sup_{X\in D_X}|h(x) - \hat{h}(X,w)|\right],$$

$\hat{h}$ represents approximation values of h; $\tilde{w}=w-w*$ is defined, wherein w* represents an amount of labor for analysis;

in order to avoid exponential increase of the number of rules, two criteria of tracking error reduction rate and fuzzy rule $\varepsilon$ completeness are adopted to execute the structural adjustment of the hierarchical type-2 fuzzy neural network; the tracking error reduction rate is defined as the derivative of the square of tracking errors between a drive system output and a response system, and the fuzzy rule $\varepsilon$ completeness is defined as that at least one fuzzy rule ensures that the trigger strength within an operation range is not less than $\varepsilon$; if the membership grade is equal to or greater than 0.5 in the hierarchy structure, the membership grade is saved; otherwise, the fuzzy rule in a self-structure algorithm is deleted;

in order to improve solving speed and simplify the structure, the hierarchical type-2 fuzzy neural network is transformed as follows:

$$w^T\xi(X) \le \zeta \xi^T(X)\xi(X)/2b^2 + b^2/2 \quad (28)$$

wherein $\zeta = \|w\|^2$, and $b>0$; $\tilde{\zeta}=\zeta-\hat{\zeta}$, wherein $\hat{\zeta}$ represents estimate values of $\zeta$, and ${}^C\mathscr{D}_{0,t}^\alpha \tilde{\zeta} = -{}^C\mathscr{D}_{0,t}^\alpha \hat{\zeta}$;

in order to avoid system performance degradation and suppress the convergence characteristics of error variables, a positive and strictly monotonically decreasing finite-time prescribed performance function is designed:

$$\beta(t) = \begin{cases} a_3 t^3 + a_2 t^2 + a_1 t + a_0, & t \in [0, T_0) \\ \beta_{T_0}, & t \geq T_0 \end{cases} \quad (29)$$

wherein $a_i$, $i=0, \cdots, 3$ represents design parameters, and $T_0$ and $\beta_{T_0}$ represent convergence time and convergence boundary, respectively; the performance function satisfies the following constraints:

$$\begin{cases} \beta(0) = \beta_0, \ ^C\mathcal{D}^\alpha \beta(0) = 0 \\ \beta(t|t \geq T_0) = \beta_{T_0}, \ ^C\mathcal{D}^\alpha \beta(t|t \geq T_0) = 0 \end{cases} \quad (30)$$

wherein $\beta_0$ represents the initial value of the finite-time prescribed performance function;

when a constraint signal is matched with the convergence rate of the prescribed performance function, a constraint condition suppresses a large overshoot of the control output at an initial stage; for the pre-given parameters $\beta_0$, $T_0$ and $\beta_{T_0}$, a satisfactory finite-time prescribed performance function is easily obtained by appropriate selection of four design parameters;

in order to achieve a faster response, a fractional-order finite-time command filter based on a first order Levant differentiator is provided:

$$\begin{cases} ^C\mathcal{D}^\alpha_{0,t} Z_{i,1}, Z_{i,1} = -c_{i,1}|Z_{i,1} - \alpha_r|^{\frac{1}{2}} \text{sign}(Z_{i,1} - \alpha_r) + Z_{i,2} \\ ^C\mathcal{D}^\alpha_{0,t} \overline{Z}_{i,2} = -c_{i,2} \text{sign}(Z_{i,2} - \overline{Z}_{i,1}), i = 1, \ldots, N \end{cases} \quad (31)$$

wherein $Z_{i,1} \in \mathbb{R}$ and $Z_{i,2} \in \mathbb{R}$ represent states of the command filter, $\alpha_r \in \mathbb{R}$ represents input signals of the command filter, $c_{i,1}$ and $c_{i,2}$ represent positive design constants, and positive constants $\Gamma_{i,1}$ and $\Gamma_{i,2}$ satisfy conditions $|Z_{i,1} - \alpha_r| \leq \Gamma_{i,1}$ and $|Z_{i,1} - ^C\mathcal{D}^\alpha_{0,t} \alpha_r| \leq \Gamma_{i,2}$; obviously, by appropriate selection of $c_{i,1}$ and $c_{i,2}$, $Z_{i,1} = \alpha_r$ and $\overline{Z}_{i,1} = ^C\mathcal{D}^\alpha_{0,t} \alpha_r$ when input noises are completely suppressed during transients of limited time;

error variables are introduced:

$$z_2 = e_2 - \alpha_2^c, \ z_3 = e_3 - \alpha_3^c \quad (32)$$

wherein $\alpha_i^c$, $i=2, 3$ and $Z_{i,1}$, $i=2, 3$ are the same, representing the output of the fractional-order command filter;

the compensated tracking error is represented as:

$$\upsilon_i = z_i - \theta_i, \ i=1,2,3 \quad (33)$$

wherein $\theta_i$ represents a compensation signal between virtual control and filtered signals;

the error variables have the following inequation:

$$-\underline{\rho}\beta(t) < e_1 < \overline{\rho}\beta(t), \forall t \geq 0 \quad (34)$$

wherein $0 < \underline{\rho}, \overline{\rho} \leq 1$;

a smooth and invertible function $S_1(z_1)$ is defined, and the above inequation is rewritable to an unconstrained form:

$$e_1 = \beta(t) S_1(z_1) \quad (35)$$

it is noted that $(\overline{\rho} e^z - \underline{\rho} e^{-z})/(e^z + e^{-z})$ belongs to one of the above-described smooth and invertible functions;

then the inverse transform of equation (35) is written as:

$$z_1 = S_1^{-1}(\phi(t)) \quad (36)$$

wherein $\phi_1(t) = e_1(t)/\beta(t)$;

the fractional-order derivative of equation (36) is derived as:

$$^C\mathcal{D}^\alpha_{0,t} z_1 = \beta^{-1}(t) \cdot ^C\mathcal{D}^\alpha_{\phi(t)} S_1^{-1}(\bullet)(^C\mathcal{D}^\alpha_{0,t} e_1(t) - \phi_1(t) ^C\mathcal{D}^\alpha_{0,t} \beta(t)) = \eta_1(^C\mathcal{D}^\alpha_{0,t} e_1 - r_1), \quad (37)$$

wherein $\eta_1 = \beta^{-1}(t) \cdot ^C\mathcal{D}^\alpha_{\phi(t)} S_1^{-1}(\phi(t))$, $r_1 = \phi_1(t) ^C\mathcal{D}^\alpha_{0,t} \beta(t)$;

by using equations (9) and (37), then:

$$^C\mathcal{D}^\alpha_{0,t} z_1 = \eta_1(f_1 + \overline{\sigma} e_2 - r_1), \ ^C\mathcal{D}^\alpha_{0,t} e_2 = f_2 + u_2, \ ^C\mathcal{D}^\alpha_{0,t} e_3 = f_3 + u_3 \quad (38)$$

$f_1 = -\rho e_1$, $f_2 = -e_2 - y_1 y_3 + x_1 x_3 - (\kappa_1 e_1 + \kappa_2 e_2) H(t - t_g) + \mu e_1$ and $f_3 = -e_3 - y_1 y_2 - x_1 x_2$ are all regarded as unknown nonlinear functions due to perturbations from wind speeds, generator temperatures, stator resistance, friction coefficient, workload, and the like;

the design of the controller comprises three steps based on a fractional-order backstepping control principle;

step 1: the above-described hierarchical type-2 fuzzy neural network is adopted to perform estimation on a compact set for facilitating controller design considering the uncertainty of $f_1$, i.e., $$f_1 = w_1^T \xi_1(\bullet) + \varepsilon_1(\bullet) \quad (39)$$

wherein $(\bullet)$ represents abbreviations of $(x_1, x_2, x_3)$, a first Lyapunov-candidate-function is selected as:

$$V_1 = \frac{1}{2}\upsilon_1^3 + \frac{1}{2}\xi_1^2 + \frac{1}{2}\theta_1^2 \quad (40)$$

the fractional-order derivative of $V_1$ is taken to obtain:

$$^C\mathcal{D}^\alpha_{0,t} V_1 \leq \upsilon_1 \eta_1 [f_1 + \overline{\sigma}(z_2 + \alpha_2^\nu + \alpha_2^c - \alpha_2^\nu) - r_1] - \upsilon_1 \ ^C\mathcal{D}^\alpha_{0,t} \theta_1 - \zeta_1 \ ^C\mathcal{D}^\alpha_{0,t} \zeta_1 + \theta_1 \ ^C\mathcal{D}^\alpha_{0,t} \theta_1 \leq \upsilon_1 \eta_1 [\upsilon_1 \eta_1 \zeta_1 \xi_1^T(\bullet) \xi_1(\bullet)/2b_1^2 + \varepsilon_1 + \overline{\sigma} z_2 + \overline{\sigma}\alpha_2^\nu + \overline{\sigma}(\alpha_2^c - \alpha_2^\nu) - r_1] - \upsilon_1 \ ^C\mathcal{D}^\alpha_{0,t} \theta_1 + \theta_1 \ ^C\mathcal{D}^\alpha_{0,t} \theta_1 + b_1^2 / 2 + \zeta_1(\upsilon_1^2 \eta_1^2 \xi_1^T(\bullet) \xi_1(\bullet)/2b_1^2 - ^C\mathcal{D}^\alpha_{0,t} \zeta_1) \quad (41)$$

wherein $\alpha_2^\nu$ and $\overline{\sigma}$ represent virtual control and $\sigma$ upper bound, respectively, and $\zeta_1 = \|w_1\|^2$ and $b_1 > 0$;

the following cost function is designed to achieve its minimum value by definition 2;

$$J_i = \int_0^\infty (\upsilon_i^2 + \delta_i^2 \upsilon_i^2 + \kappa_i^2 u_{oi}^2) dt, \ i = 2, 3 \quad (42)$$

wherein $u_{oi}$, $\delta_i^2$ and $\kappa_i$ represent an optimal control input, a normal constant and a design parameter, respectively; the following inequation $\varepsilon_i^2(\bullet) \leq \delta_i^2 \upsilon_i^2$, $i=1, 2, 3$ is used in order to compensate estimation errors of the hierarchical type-2 fuzzy neural network;

the optimal control input is designed as $u_{oi} = -P_i \upsilon_i / \kappa_i^2$, $i=1, 2, 3$, wherein $P_i$ is the solution of an algebraic Riccati equation $P_i^2 + 2k_i P_i - \kappa_i^2 - 1 = 0$, $k_i > 0$;

the optimal control input is derived as:

$$u_{oi} = -(\sqrt{1 + k_i^2 + \delta_i^2} - k_i)\upsilon_i / \kappa_i^2, \ i=1,2,3 \quad (43)$$

virtual control, and an adaptive law and a compensation signal thereof are selected:

$$\alpha_2^\nu = (-k_1 z_1 - \upsilon_1 \eta_1 \zeta_1 \xi_1^T(\bullet) \xi_1(\bullet)/2b_1^2 + r_1 - s_1 \upsilon_1^\gamma + u_{oi})/\overline{\sigma} \quad (44)$$

$$\mathscr{D}_{0,t}^\alpha \hat{\zeta}_1 = v_1^2 \eta_1^2 \xi_1^T(\cdot)\xi_1(\cdot)/2b_1^2 - \gamma_1 \hat{\zeta}_1 \tag{45}$$

$$\mathscr{D}_{0,t}^\alpha \theta_1 = -k_1 \eta_1 \theta_1 + \overline{\sigma}\eta_1(\alpha_2^c - \alpha_2^v + \theta_2) - l_1 \theta_1^\gamma \tag{46}$$

wherein $k_1 > 0$, $l_1 > 0$, $\gamma_1 > 0$, $s_1 > 0$, and $0 < \gamma < 1$;
equations (44)-(46) are substituted into inequation (41) by inequation (14) to obtain:

$$\begin{aligned}{}^C\mathscr{D}_{0,t}^\alpha V_1 \leq &-k_1\eta_1 v_1^2 - k_1\eta_1\theta_1^2 + \overline{\sigma}\eta_1 v_1 v_2 + \overline{\sigma}\eta_1\theta_1\theta_2 + \\ &\overline{\sigma}\eta_1(\theta_1^2 + \Gamma_{2,1}^2)/2 + b_1^2/2 + \gamma_1\hat{\zeta}_1\tilde{\zeta}_1 + \eta_1 v_1^2(1/2 + \delta_1^2/2 - \\ &\sqrt{1+k_1^2+\delta_1^2} - k_1)/\kappa_1^2) - b_1|v_1|^{\gamma+1} - d_1|\theta_1|^{\gamma+1}\end{aligned} \tag{47}$$

wherein $b_1 = s_1\eta_1 - l_1\vartheta_1/(\gamma+1)$, and $d_1 = l_1(1 - \gamma\vartheta_1^{-1/\gamma}/(\gamma+1))$;
step 2: a hierarchical type-2 fuzzy neural network is used to approximate the aforementioned unknown nonlinear function $f_2$ with high precision in the following form to solve the unknown nonlinear function:

$$f_2 = w_2^T \xi_2(\cdot) + \varepsilon_2(\cdot) \tag{48}$$

a second Lyapunov-candidate-function is selected as:

$$V_2 = V_1 + \frac{1}{2}v_2^2 + \frac{1}{2}\tilde{\zeta}_2^2 + \frac{1}{2}\theta_2^2 \tag{49}$$

the fractional-order derivative of $V_2$ is written as:

$$\begin{aligned}{}^C\mathscr{D}_{0,t}^\alpha V_2 \leq &-k_1\eta_1 v_1^2 - k_1\eta_1\theta_1^2 + \overline{\sigma}\eta_1(\theta_1^2 + \Gamma_{2,1}^2)/2 + \sum_{i=1}^2 b_i^2/2 + \gamma_1\hat{\zeta}_1\tilde{\zeta}_1 - \\ &d_1|\theta_1|^{\gamma+1} + v_2(\hat{\zeta}_2 v_2\xi_2^T(\cdot)\xi_2(\cdot)/2b_2^2 + u_2 + \varepsilon_2 + \overline{\sigma}\eta_1 z_1 - {}^C\mathscr{D}_{0,t}^\alpha \alpha^c) - \\ &v_2 \cdot {}^C\mathscr{D}_{0,t}^\alpha \theta_2 + \theta_2(\overline{\sigma}\eta_1\theta_1 + {}^C\mathscr{D}_{0,t}^\alpha \theta_2) + \tilde{\zeta}_2(v_2^2\xi_2^T(\cdot)\xi_2(\cdot)/2b_2^2 - {}^C\mathscr{D}_{0,t}^\alpha \hat{\zeta}_2) - \\ &b_1|v_1|^{\gamma+1} - \overline{\sigma}\eta_1 v_2\theta_1 + \eta_1 v_1^2(1/2 + \delta_1^2/2 - (\sqrt{1+k_1^2+\delta_1^2} - k_1)/\kappa_1^2)\end{aligned} \tag{50}$$

wherein $\zeta_2 = \|w_2\|^2$, and $b_2 > 0$;
the q-axis control input and the adaptive law and the compensation signal are designed as follows:

$$u_2 = -k_2 z_2 - \overline{\sigma}\eta_1 z_1 - \frac{\hat{\zeta}_2}{2b_2^2} v_2 \xi_2^T(\cdot)\xi_2(\cdot) + {}^C\mathscr{D}_{0,t}^\alpha \alpha_2^c - s_2 v_2^\gamma + u_{o2} \tag{51}$$

$$^C\mathscr{D}_{0,t}^\alpha \hat{\zeta}_2 = v_2^2 \xi_2^T(\cdot)\xi_2(\cdot)/2b_2^2 - \gamma_2\hat{\zeta}_2 \tag{52}$$

$$^C\mathscr{D}_{0,t}^\alpha \theta_2 = -k_2\theta_2 - \overline{\sigma}\eta_1\theta_1 - l_2\theta_2^\gamma \tag{53}$$

wherein $k_2 > 0$, $l_2 > 0$, $\gamma_2 > 0$ and $s_2 > 0$;
by equation (51)-(53), inequation (50) is further simplified as:

$$\begin{aligned}{}^C\mathscr{D}_{0,t}^\alpha V_2 \leq &k_1\eta_1 v_1^2 - k_2 v_2^2 + k_1\eta_1\theta_1^2 - k_2\theta_2^2 + \overline{\sigma}\eta_1(\theta_1^2 + \Gamma_{2,1}^2)/2 + \\ &\sum_{i=1}^2 b_i^2/2 + \sum_{i=1}^2 \gamma_i\hat{\zeta}_i\tilde{\zeta}_i + \eta_1 v_1^2(1/2 + \delta_1^2/2 - (\sqrt{1+k_1^2+\delta_1^2} - k_1)/\kappa_1^2) -\end{aligned} \tag{54}$$

-continued $$\sum_{i=1}^2 d_i|\theta_i|^{\gamma+1} - \sum_{i=1}^2 b_i|v_i|^{\gamma+1} + v_2^2\left(\frac{1}{2} + \frac{\delta_2^2}{2} - \frac{1}{\kappa_2^2}\left(\sqrt{1+k_2^2+\delta_2^2} - k_2\right)\right)$$

wherein $b_1 = s_2 - l_2\vartheta_2/(\gamma+1)$, and $d_2 = l_2(1 - \gamma\vartheta_2^{-1/\gamma}/(\gamma+1))$;
step 3: a hierarchical type-2 fuzzy neural network with very high precision and repeatability is used for estimation to process the unknown nonlinear function $f_3$:

$$f_3 = w_3^T \xi_3(\cdot) + \varepsilon_3(\cdot) \tag{55}$$

the magnetic field orientation control is adopted, so that a is equal to zero; a last Lyapunov candidate function is defined as:

$$V_3 = V_2 + \frac{1}{2}v_3^2 + \frac{1}{2}\tilde{\zeta}_3^2 + \frac{1}{2}\theta_3^2 \tag{56}$$

the fractional-order derivative of $V_3$ is calculated as:

$$\begin{aligned}{}^C\mathscr{D}_{0,t}^\alpha V_3 \leq &k_1\eta_1 v_1^2 - k_2 v_2^2 + k_1\eta_1\theta_1^2 + k_2\theta_2^2 + \overline{\sigma}\eta_1(\theta_1^2 + \Gamma_{2,1}^2)/2 + \\ &\sum_{i=1}^3 b_i^2/2 + \sum_{i=1}^2 \gamma_i\hat{\zeta}_i\tilde{\zeta}_i + \sum_{i=1}^2 d_i|\theta_i|^{\gamma+1} - \sum_{i=1}^2 b_i|v_i|^{\gamma+1} + \theta_3^C\mathscr{D}_{0,t}^\alpha \theta_3 + \\ &v_3(\hat{\zeta}_3 v_3\xi_3^T(\cdot)\xi_3(\cdot)/2b_3^2 + u_3 + \varepsilon_3) + \tilde{\zeta}_3(v_3^2\xi_3^T(\cdot)\xi_3(\cdot)/2b_3^2 - {}^C\mathscr{D}_{0,t}^\alpha\hat{\zeta}_3) + \\ &\eta_1 v_1^2(1/2 + \delta_1^2/2 - (\sqrt{1+k_1^2+\delta_1^2} - k_1)/\kappa_1^2) - \\ &v_3^C\mathscr{D}_{0,t}^\alpha \theta_3 + v_2^2(1/2 + \delta_2^2/2 - (\sqrt{1+k_2^2+\delta_2^2} - k_2)/\kappa_2^2)\end{aligned} \tag{57}$$

wherein $\zeta_3 = \|w_3\|^2$, and $b_3 > 0$;
the d-axis control input, the adaptive law and the compensation signal are designed as follows:

$$u_3 = -k_3 z_3 - \hat{\zeta}_3 v_3 \xi_3^T(\cdot)\xi_3(\cdot)/2b_3^2 - s_3 v_3^\gamma + u_{o3} \tag{58}$$

$$^C\mathscr{D}_{0,t}^\alpha \hat{\zeta}_3 = v_3^2 \xi_3^T(\cdot)\xi_3(\cdot)/2b_3^2 - \gamma_3\hat{\zeta}_3 \tag{59}$$

$$^C\mathscr{D}_{0,t}^\alpha \theta_3 = -k_3\theta_3 - l_3\theta_3^\gamma \tag{60}$$

wherein $k_3 > 0$, $l_3$, $\gamma_3 > 0$ and $s_3 > 0$;
obtaining:

$$\begin{aligned}{}^C\mathscr{D}_{0,t}^\alpha V_3 \leq & \\ &-k_1\eta_1 v_1^2 - \sum_{i=2}^3 k_i v_i^2 - k_1\eta_1\theta_1^2 - \sum_{i=2}^3 k_i\theta_i^2 + \overline{\sigma}\eta_1(\theta_1^2 + \Gamma_{2,1}^2)/2 + k = \\ &\eta_1 v_1^2(1/2 + \delta_1^2/2 - (\sqrt{1+k_1^2+\delta_1^2} - k_1)/\kappa_1^2) - \\ &\sum_{i=1}^3 b_i|v_i|^{\gamma+1} + \sum_{i=2}^3 v_i^2\left(\frac{1}{2} + \frac{\delta_i^2}{2} - \frac{1}{\kappa_i^2}\left(\sqrt{1+k_i^2+\delta_i^2} - k_i\right)\right) + \\ &\sum_{i=1}^3 b_i^2/2 + \sum_{i=1}^3 \gamma_i\hat{\zeta}_i\tilde{\zeta}_i - \sum_{i=1}^3 d_i|\theta_i|^{\gamma+1}\end{aligned} \tag{61}$$

wherein $b_3 = s_3 - l_3\vartheta_3/(\gamma+1)$, and $d_3 = l_3(1 - \gamma\vartheta_3^{-1/\gamma}/(\gamma+1))$.

* * * * *